United States Patent
Cha et al.

(10) Patent No.: US 10,165,096 B2
(45) Date of Patent: Dec. 25, 2018

(54) MOBILE TERMINAL

(71) Applicant: LG ELECTRONICS INC., Seoul (KR)

(72) Inventors: Youngdo Cha, Seoul (KR); Hyunsu Song, Seoul (KR); Bonghyun Lee, Seoul (KR); Choonhwa Lee, Seoul (KR); Dongwon Han, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/613,925

(22) Filed: Jun. 5, 2017

(65) Prior Publication Data

US 2018/0248987 A1    Aug. 30, 2018

(30) Foreign Application Priority Data

Feb. 24, 2017    (KR) ............. 10-2017-0024996

(51) Int. Cl.

| | |
|---|---|
| *G06F 1/16* | (2006.01) |
| *H04M 1/02* | (2006.01) |
| *H04M 1/18* | (2006.01) |
| *H01R 13/52* | (2006.01) |
| *H04B 1/3888* | (2015.01) |
| *H01R 43/00* | (2006.01) |

(52) U.S. Cl.
CPC ...... *H04M 1/0249* (2013.01); *H01R 13/5213* (2013.01); *H01R 43/005* (2013.01); *H04B 1/3888* (2013.01); *H04M 1/0262* (2013.01); *H04M 1/18* (2013.01)

(58) Field of Classification Search
CPC .... H05K 5/069; H05K 5/0239; G06F 1/1656; G06F 1/1626
See application file for complete search history.

(56) References Cited

U.S. PATENT DOCUMENTS

| | | | | |
|---|---|---|---|---|
| 8,199,464 | B2* | 6/2012 | Zuo | H01R 13/447 200/302.1 |
| 8,734,188 | B2* | 5/2014 | Nakase | G06K 13/0831 439/159 |
| 8,747,131 | B2* | 6/2014 | Nakase | G06K 13/0831 439/159 |
| 8,777,669 | B2* | 7/2014 | Hu | H01R 12/714 439/159 |
| 9,118,140 | B2* | 8/2015 | Chang | G06K 19/005 |
| 9,795,044 | B2* | 10/2017 | Lai | H05K 5/0086 |
| 2002/0119697 | A1* | 8/2002 | Chan | H01R 13/5213 439/519 |
| 2011/0090652 | A1* | 4/2011 | Wee | H05K 5/069 361/749 |

(Continued)

*Primary Examiner* — Hoa C Nguyen
*Assistant Examiner* — Christopher L Augustin
(74) *Attorney, Agent, or Firm* — Birch, Stewart, Kolasch & Birch, LLP

(57) ABSTRACT

A mobile terminal is disclosed. The mobile terminal includes a body; a body hole formed in the body, the body hole communicating an inside and an outside of the body; and a waterproof unit positioned and movable in the body hole, the waterproof unit including: a rod extended in a communicating direction of the body hole; a stopper connected to an end of the rod, a portion of the stopper having a inclined shape with respect to a longitudinal direction of the rod; and a packing ring surrounding the rod, the packing ring sealing the body hole.

17 Claims, 42 Drawing Sheets

(56) References Cited

U.S. PATENT DOCUMENTS

| | | | | |
|---|---|---|---|---|
| 2011/0110022 A1* | 5/2011 | Kumagai | ............. | G06F 1/1616 |
| | | | | 361/679.01 |
| 2012/0307451 A1* | 12/2012 | Shukla | ................ | G06F 1/1658 |
| | | | | 361/699 |
| 2013/0062837 A1* | 3/2013 | Sasaki | ................ | H04M 1/0235 |
| | | | | 277/650 |
| 2013/0267106 A1* | 10/2013 | Jenks | ..................... | G11B 17/00 |
| | | | | 439/160 |
| 2014/0167365 A1* | 6/2014 | Chu | ...................... | F16J 15/025 |
| | | | | 277/590 |
| 2015/0155651 A1* | 6/2015 | Ejiri | .................. | H01R 13/5213 |
| | | | | 439/521 |
| 2015/0201518 A1* | 7/2015 | Hsu | ..................... | H05K 7/1461 |
| | | | | 361/807 |
| 2017/0098906 A1* | 4/2017 | Suzuki | ................ | H01R 13/5213 |
| 2017/0108897 A1* | 4/2017 | Choi | .................... | G06F 1/1656 |

\* cited by examiner (a)

(b)

MOBILE TERMINAL

This application claims the benefit of Korean Patent Application No. 10-2017-0024996 filed on Feb. 24, 2017, the entire contents of which are incorporated herein by reference for all purposes as if fully set forth herein.

BACKGROUND OF THE INVENTION

Field of the Invention

This invention relates to a mobile terminal. Especially, this invention is related to the mobile terminal for waterproofing a hole used for input/output of a SIM tray.

Discussion of the Related Art

A terminal may be categorized into a mobile/portable terminal or a stationary terminal depending on whether the terminal is movable. The mobile terminal may be categorized into a handheld terminal or a vehicle mounted terminal according to whether the user can carry the mobile phone directly.

The functions of mobile terminals have been diversified. For example, the functions of mobile terminals are: communication of data and voice, photographing and video shooting through a camera, voice recording, music file playback through a speaker system, and outputting an image or video to a display unit. Some mobile terminals are equipped with an electronic game play function or a multimedia player function. In particular, mobile terminals may receive multicast signals that provide visual content such as broadcast and video or television programs.

Such a terminal has been a multimedia player having a complex function such as photographing or video shooting, playback of music or video file.

For supporting and increasing the functionality of such terminals, it is contemplated to improve the structural and/or software aspects of the terminal.

Recently, mobile terminals having a waterproof function have been released. In particular, a configuration for a waterproof function regarding a hole formed in a mobile terminal can be applied to a mobile terminal.

SUMMARY OF THE INVENTION

Accordingly, an object of the present disclosure is to address the above-described and other problems.

Another object of the present invention is to provide a mobile terminal for sealing a hole used for input/output of a SIM tray.

Another object of the present invention is to provide a mobile terminal having a waterproof pin that shields or seals a hole and has improved durability.

Another object of the present invention is to provide a mobile terminal in which rotation of a waterproof pin for sealing a hole is suppressed.

According to an aspect of this invention, there is provided a mobile terminal, comprising: a body; a body hole formed in the body, the body hole communicating an inside and an outside of the body; and a waterproof unit positioned and movable in the body hole, the waterproof unit including: a rod extended in a communicating direction of the body hole; a stopper connected to an end of the rod, a portion of the stopper having a inclined shape with respect to a longitudinal direction of the rod; and a packing ring surrounding the rod, the packing ring sealing the body hole.

According to another aspect of this invention, the packing ring may have a diameter greater than a diameter of the body hole, and the packing ring may have elasticity.

According to another aspect of this invention, the packing ring may have a plurality of packing rings, and at least one of the plurality of packing rings is positioned in the body hole when the waterproof unit moves in the body hole.

According to another aspect of this invention, the stopper may include: a pedestal facing the packing ring; and a guide extended from the pedestal. The guide may have an inclined surface tilt with respect to the longitudinal direction of the rod.

According to another aspect of this invention, a diameter of the pedestal may be greater than a diameter of the body hole, and a side of the guide may be connected to the pedestal and another side of the guide faces outside of the waterproof unit.

According to another aspect of this invention, the inclined surface may connect the side of the guide and the other side of the guide.

According to another aspect of this invention, a diameter of the side of the guide is smaller than a diameter of the other side of the guide.

According to another aspect of this invention, the stopper may include a first stopper positioned at an end of the rod and a second stopper positioned at another end of the rod, and the first stopper may be positioned in inside of the body and outside of the body hole.

According to another aspect of this invention, a diameter of the first stopper may be greater than a diameter of the body hole.

According to another aspect of this invention, the second stopper may be located in inside of the body hole when the waterproof unit moves towards inside of the body.

According to another aspect of this invention, the rod may include a depression formed concavely on an outer surface of the rod.

According to another aspect of this invention, the rod may include: an end protruding surface positioned at an end of the rod, the end protruding surface adjacent to the depression; and an inner protruding surface positioned at an inner side of the rod, the inner protruding surface adjacent to the depression. The stopper may be positioned on the end protruding surface, and the packing ring may be positioned on the inner protruding surface.

According to another aspect of this invention, the waterproof unit may further include a connection portion surrounding the rod, and the connection portion may have a diameter greater than a diameter of the body hole.

According to another aspect of this invention, the connection portion may be positioned on the depression of the rod.

According to another aspect of this invention, the mobile terminal may further comprise a force transmitting member facing the waterproof unit. The force transmitting member may be provided with a force from the waterproof unit, and provide the waterproof unit with an elastic force.

According to at least one of the embodiments of the present invention, a hole formed in the mobile terminal may be sealed effectively with improved waterproof unit.

According to at least one of the embodiments of the present invention, the durability of the pin that shields or seals the hole formed in the mobile terminal may be expected to be improved.

According to at least one of the embodiments of the present invention, it is possible to suppress rotation of the pin sealing the hole formed in the mobile terminal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
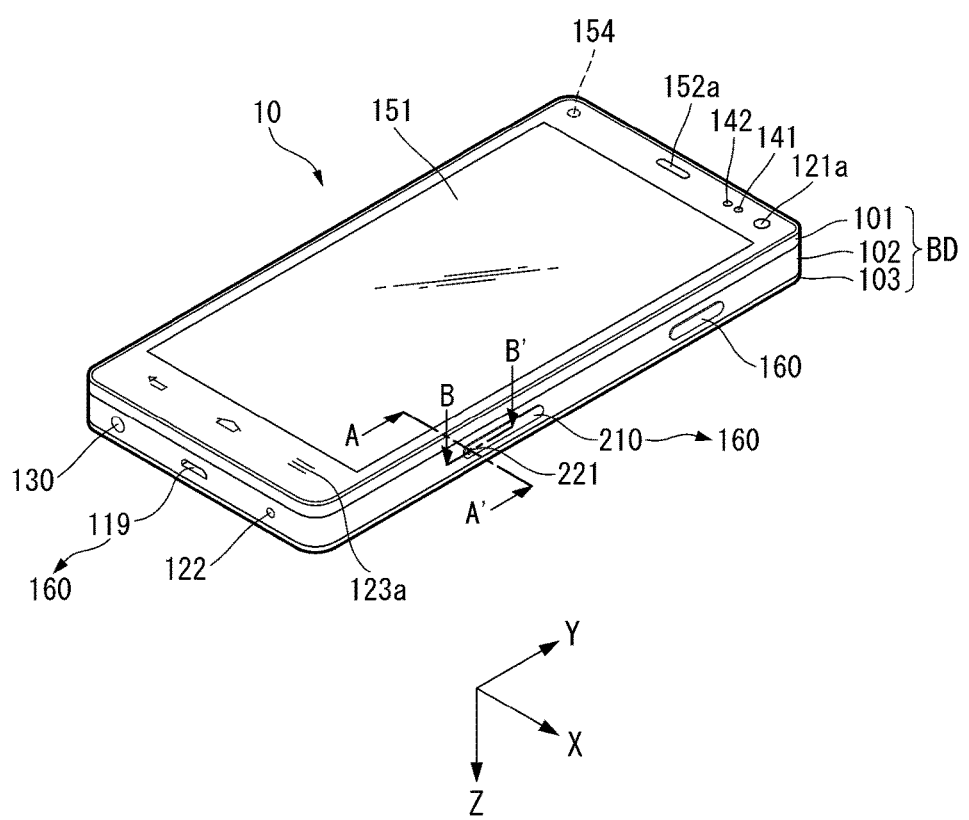
FIGS. 1 and 2 are conceptual diagrams viewing a mobile terminal according to an embodiment of the present invention in different directions.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

The mobile terminal described in this specification includes a mobile phone, a smart phone, a laptop computer, a digital broadcasting terminal, a personal digital assistant (PDA), a portable multimedia player (PMP), a slate PC, a tablet PC, an ultrabook, and a wearable device (such as a smartwatch, a smart glass, and a head mounted display (HMD)).

However, it could be understood by those skilled in the art that the configuration according to the embodiments described herein may be applied to fixed terminals such as a digital TV, a desktop computer, a digital signage, and the like.

The coordinate system used in the present specification is a Cartesian coordinate system as an orthogonal coordinate system. For example, the coordinate system used in this specification is an XYZ coordinate system. In this specification, the XYZ coordinate system is the left handed direction. In other words, when index finger to little finger of the left hand are wound from the X axis to the Y axis, the direction indicated by the thumb becomes the Z axis.

Figure 2:
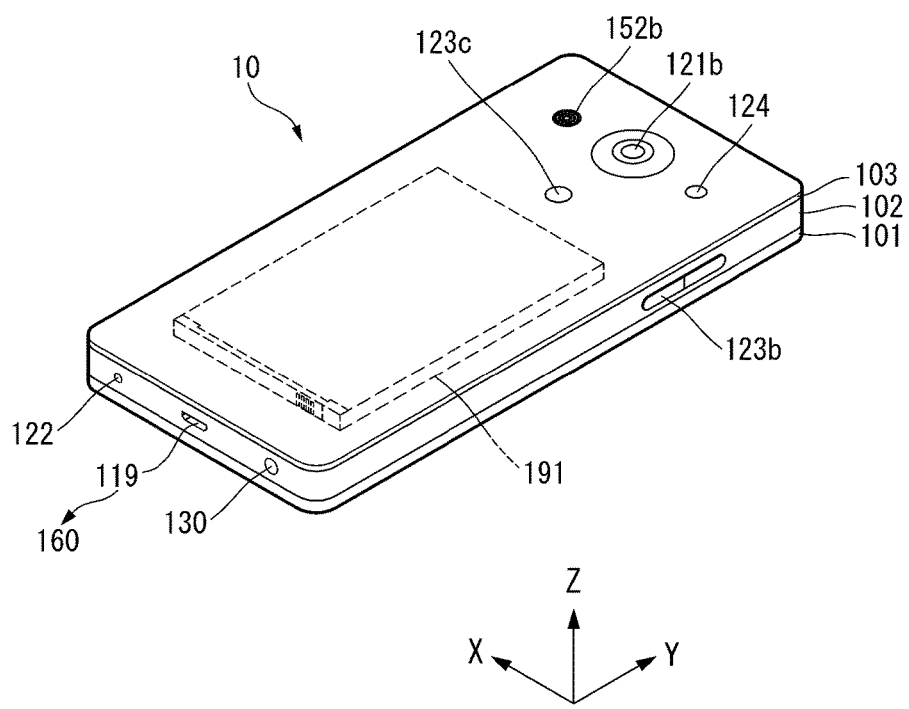

FIGS. 1 and 2 are conceptual diagrams viewing a mobile terminal according to an embodiment of the present invention in different directions.

Referring to FIGS. 1 and 2, the disclosed mobile terminal 10 includes a bar-shaped body. However, the present invention is not limited thereto, and may be applied to various structures such as a watch type, a clip type, or a glass type. The present invention may be applied various structures in which two or more bodies are movably coupled, such as a folder type, a flip type, a slide type, a swing type, and a swivel type. A description of a particular type of mobile terminal, although relevant to a particular type of mobile terminal, is generally applicable to other types of mobile terminals.

Here, the body of the terminal may be understood as a concept of referring to the mobile terminal 10 as at least one aggregate.

The mobile terminal 10 may include a case (for example, a frame, a housing, a cover, etc.) which forms an appearance. As shown, the mobile terminal 10 may include a front case 101 and a rear case 102. Various electronic components are disposed in the inner space formed by the front case 101 and the rear case 102. At least one middle case may be additionally disposed between the front case 101 and the rear case 102.

A display unit 151 may be disposed on a front surface of the terminal body to output information. The window 151*a* of the display unit 151 may be mounted on the front case 101 to form a front surface of the terminal body together with the front case 101.

In some cases, electronic components may also be mounted on the rear case 102. The electronic components that are available to be mounted on the rear case 102 include a detachable battery, an identification module, a memory card, and the like. In this case, a rear cover 103 for covering the mounted electronic component may be detachably coupled to the rear case 102. Therefore, when the rear cover 103 is separated from the rear case 102, the electronic components mounted on the rear case 102 may be exposed to the outside.

When the rear cover 103 is coupled to the rear case 102, a lateral portion of the rear case 102 may be exposed. In some cases, the rear case 102 may be completely covered by the rear cover 103, when the rear case 102 and the rear cover 103 are coupled. Meanwhile, the rear cover 103 may be provided with an opening for exposing the camera 121*b* and the sound output unit 152*b*.

These cases 101, 102, and 103 may be formed by injection molding of synthetic resin or may be formed of metal such as stainless steel (STS), aluminum (Al), titanium (Ti), or the like.

The mobile terminal 10 may be configured such that one case provides the inner space, unlike the above example in which a plurality of cases provide an inner space for accommodating various electronic components. In this case, a mobile terminal 10 may have a unibody in which a synthetic resin or a metal is connected from the lateral to the rear.

Meanwhile, the mobile terminal 10 may include a waterproof unit (not shown) for preventing water from penetrating into the terminal body. For example, the waterproof unit may be provided with a waterproof member between the window 151*a* and the front case 101, between the front case 101 and the rear case 102, or between the rear case 102 and the rear cover 103. The waterproof member may seal an inner space formed between them.

The mobile terminal 10 may include the display unit 151, a first and a second audio output unit 152*a*, 152*b*, the proximity sensor 141, the illuminance sensor 142, the optical output unit 154, a first and a second cameras 121*a*, 121*b*, a first to a third manipulation units 123*a*, 123*b*, 123*c*, the microphone 122, the interface unit 160, and an earphone jack 130.

Hereinafter, as shown in FIGS. 1 and 2, on a front of the terminal body are disposed the display unit 151, the first audio output unit 152*a*, the proximity sensor 141, the illuminance sensor 142, the optical output unit 154, the first camera 121*a*, and the first manipulation unit 123*a*. On a lateral side of the body are disposed the second manipulation unit 123*b*, the microphone 122, the earphone jack 130, and the interface unit 160. On a rear side of the body are disposed the second audio output unit 152*b*, the third manipulation unit 123*c*, and the second camera 121*b*. The mobile terminal 10, which includes the front side of the body, the lateral side of the body, and the rear side of the body, may be described as an example.

However, these configurations are not limited to this arrangement. These configurations may be excluded or replaced, or disposed on the other side as needed. For example, the front side of the body may not be provided with the first manipulation unit 123*a*, and the second audio output unit 152*b* may be provided on not the rear side of the body but the lateral side of the body.

The body BD of the mobile terminal 10 may include a front case 101, a rear case 102 and a rear cover 103. The rear cover 103 may be integrally formed with the rear case 102. The body BD of the mobile terminal 10 may include a front case 101 and a rear case 102.

The display unit 151 displays (or outputs) information processed by the mobile terminal 10. For example, the display unit 151 may display execution screen information of an application program driven by the mobile terminal 10, or UI (User Interface) and GUI (Graphic User Interface) information according to the execution screen information.

The display unit 151 may include at least one of a liquid crystal display (LCD), a thin film transistor-liquid crystal display (TFT LCD), an organic light-emitting diode (OLED), a flexible display, and a 3D display, an e-ink display.

Further, the display unit 151 may be provided two or more depending on the implementation of the mobile terminal 10. In this case, a plurality of display unit may be spaced apart to one surface or may be disposed integrally, may also be disposed on different surfaces respectively in the mobile terminal 10.

The display unit 151 may include a touch sensor for sensing a touch on the display unit 151 to receive a control command. By using this, when a touch is applied to the display unit 151, the touch sensor senses the touch and a controller may generate a control command corresponding to the touch. Information that is input by the touch may be either a letter or a number, and it may be a specified or indicated menu items in the various modes. The controller may be implemented by some electronic components installed in the body BD. For example, the controller may be implemented by some electronic substrates or boards.

Meanwhile, the touch sensor may be configured as a film type having a touch pattern, and may be arranged between a window of the display unit 151 and a display panel on a rear side of the window of the display unit 151, or may be a metal wire patterned directly on the rear surface of the window of the display unit 151. Alternatively, the touch sensor may be formed integrally with the display unit 151. For example, the touch sensor may be disposed on a substrate of the display unit 151, or may be provided in an interior of the display unit 151.

Like this, the display unit 151 may form a touch screen with the touch sensor. In this case, the touch screen may work as the manipulation unit 123*a*. In some cases, the touch screen may replace at least some functions of the first manipulation unit 123*a*.

The first audio output unit 152*a* may be implemented as a receiver for transmitting the other party's voice to an ear of the user. The second audio output unit 152*b* may be implemented as a loud speaker for outputting various kinds of alarm sounds or playing sounds of multimedia.

The window of the display unit 151 may form a sound hole for the release of a sound generated from the first audio output unit 152a. However, the present invention is not limited to this. The sound may be released along an assembly gap between structures (for example, a gap between the window of the display unit 151 and the front case 101). In this case, since holes formed independently for sound output are apparently invisible or hidden, the external appearance of the mobile terminal 10 can become much simpler.

The optical output unit 154 may output a light to inform a user of an event occurred. The events may be a message reception, a call signal reception, a missed call, an alarm, event notification, e-mail reception, or an information reception via an application. If the user's confirmation of the event is detected, the controller may control the optical output unit 154 to be terminated.

The first camera 121a may include an image sensor for acquiring an image. The first camera 121a may process an image frame of a still image or a moving image obtained by the image sensor in the photographing mode or the video communication mode. The processed image frame may be displayed on the display unit 151 and can be stored in the memory.

The first to third manipulation units 123a, 123b, 123c may be operated to receive commands for controlling the operation of the mobile terminal 10, and may be collectively referred to as manipulating portion. The first to third manipulation units 123a, 123b, and 123c may be adopted in any way if the way is touch, push, scroll, etc. as tactile manner that is operated while the user is receiving a tactile feel. Further, the first and second manipulation units 123a, 123b may be adopted also in such a way that is operated without the tactile feel of the user through proximity touch and hovering touch, etc. The third manipulation unit 123c may obtain the user's fingerprints with a fingerprint sensor. The obtained fingerprint information may be provided to the controller.

The first manipulation unit 123a may be a touch key as an example, but the present invention is not limited to this. For example, the first manipulation unit 123a may be a mechanical key, or may be composed of a combination of the touch key and the mechanical key.

The information that is input by the first and second manipulation units 123a, 123b may be variously set. For example, the first manipulation unit 123a may receive commands on menu, home key, cancel, search, etc. The second manipulation unit 123b may receive input commands, such as adjusting volume level of sound outputted from the first or the second audio output unit 152a, 152b, and switching to a touch recognition mode of the display unit 151.

Meanwhile, the rear surface of the terminal body may be provided with the third manipulation unit 123c as another example of the user input unit 123. The third manipulation unit 123c is to be manipulated in order to receive a command for controlling an operation of the mobile terminal 10, and information to be input may be variously set. For example, the third manipulation unit 123c may receive input commands, such as on/off of the power supply, start, end, scroll, etc., adjusting volume level of sound outputted from the first or the second audio output unit 152a, 152b, switching to a touch recognition mode of the display unit 151, and acquisition of fingerprint information. A rear input unit may be implemented in the form of a touch input and a push input, or in the form of a combination thereof.

The rear input unit may be disposed to be overlapped with the display unit 151 of the front surface in a thickness direction of the terminal body. For example, the rear input unit may be disposed on the rear upper end of the terminal body so as to be easily manipulated using an index finger when the user squeezes the terminal body with one hand. However, the present invention is not limited to this, and the location of the rear input unit can be changed.

In case the rear input unit is provided on the rear surface of the terminal body, a new type of user interface may be implemented using this. In addition, in case the first manipulation unit 123a is not disposed on the front surface of the terminal body by replacing at least some functions of the first manipulation unit 123a which is provided on the front surface of the terminal body with the previously described touch screen or the rear input unit, the display unit 151 may be configured in a more large screen.

Meanwhile, the mobile terminal 10 may be provided with a fingerprint recognition sensor to recognize fingerprints of the user, and the controller 180 may use the fingerprint information detected by the fingerprint recognition sensor as an authentication means. The fingerprint recognition sensor may be embedded in the display unit 151 or the user input unit 123.

The microphone 122 may be made to be provided with a user's voice, other sound and so on. The microphone 122 may be provided in a plurality of locations and may be configured to get a stereo sound.

The interface unit 160 may be a passage that can connect the mobile terminal 10 to an external device. For example, the interface unit 160 may be at least one of connection terminals for connection to another device (for example, an earphone, an external speaker), ports for short-range communication [for example, an infrared port (IrDA Port), a Bluetooth port, a wireless LAN Port, etc.], or power supply terminals for supplying power to the mobile terminal 10.

The interface unit 160 may be implemented in the form of a socket for accommodating SIM (Subscriber Identification Module) or UIM (User Identity Module), or an external card such as a memory card for information storage. For example, referring to FIG. 1, the interface unit 160 may include input-output port 119 and SIM tray 210. The SIM tray 210 may load a SIM card. The SIM tray 210 may move to the inside and outside of the mobile terminal 10 for replacement and/or replacement of the SIM card. The input-output port 119 may be a path for electric power to be provided to the mobile terminal 10. The input-output port 119 may be connected to an external terminal or an external electronic device, and may be a path for information and electric signals between the mobile terminal 10 and the external terminal.

The second camera 121b may be disposed on the rear surface of the terminal body. In this case, the second camera 121b may shoot in opposite direction in comparison with the first camera 121a.

The second camera 121b may include a plurality of lenses that are arranged along at least one line. The plurality of lenses may be arranged in matrix form. These cameras may be referred to as 'array camera'. When the second camera 121b is configured by an array camera, it is possible to take images in a variety of ways using the plurality of lenses, and to obtain a better quality image.

A flash 124 may be disposed adjacent to the second camera 121b. The flash 124 may illuminate light toward an object when the second camera 121b is for shooting the object.

The second audio output unit 152b may be additionally disposed in the body BD. The second audio output unit 152b may implement a stereo function together with the first audio output unit 152a, and may be used for the implementation of a speakerphone mode during a call.

The body BD may be provided with at least one antenna for a wireless communication. The antenna may be embedded in the body BD or may be formed on the body BD. For example, an antenna that is part of a broadcast receiving module, may be configured to be drawn out from the body BD. Alternatively, the antenna may be formed in a film type and may be attached to an inner surface of the rear cover 103. A case comprising a conductive material may work as an antenna.

The body BD may be provided with a power supply unit on purpose of supplying an electric power to the mobile terminal 10. The power supply unit may be embedded in the body BD or may include a battery 191 which is detachable.

The battery 191 may be configured to be provided with the electric power via power cable connected to the interface unit 160. Further, the battery 191 may be configured to be charged by using wireless-charger. The wireless charging may be implemented by magnetic induction or resonance manner (magnetic resonance scheme).

Meanwhile, referring to the FIGS. 1 and 2, the rear cover 103 may be coupled to the rear case 102 to cover the battery 191 and may prevent separation of the battery 191 and may protect the battery 191 from an external impact and foreign matter. When the battery 191 is configured to be detachable on the terminal body, the rear cover 103 may be detachably coupled to the rear case 102.

An accessory to protect an appearance of the mobile terminal 10 or to assist or extend a function of the mobile terminal 10 may be added to the mobile terminal 10. An example of the accessory may be a cover to cover at least one surface of the mobile terminal 10 or a pouch to accommodate at least one surface of the mobile terminal 10. The cover or the pouch may be configured to extend the function of the mobile terminal 10 by interacting with the display unit 151. Another example of the accessory may be a touch pen to assist or extend a touch input on the touch screen.

Figure 3:
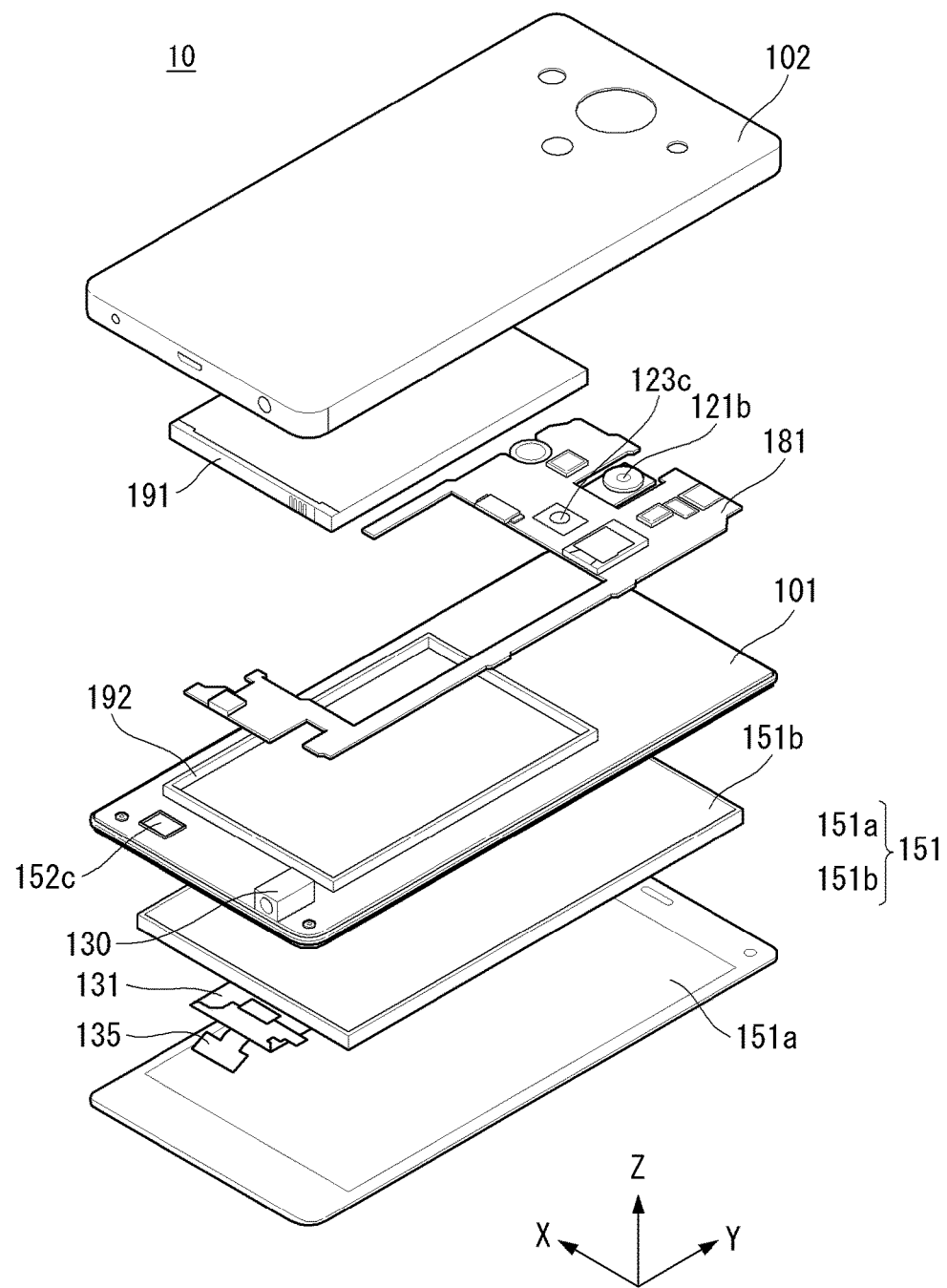
FIG. 3 is an exploded perspective view of the mobile terminal of FIG. 1.

FIG. 3 is an exploded perspective view of the mobile terminal of FIG. 1. The rear case 102 of the mobile terminal 10 may be integrally formed with the rear cover 103 (see FIG. 1). When the rear case 102 is integrally formed with the rear cover 103 (see FIG. 1), at least a part of the rear case 102 may be easily made of metal. When the rear case 102 is integrally formed with the rear cover 103 (see FIG. 1), it can be advantageous in securing the rigidity of the rear case 102.

The front case 101 may be fastened to the rear case 102. Electronic components may be disposed between the front case 101 and the rear case 102. When the front case 101 is fastened to the rear case 102, the electronic parts located inside the mobile terminal 10 may not be exposed to the outside. A battery 191, a main circuit board 181, an acoustic output unit 152c, and an earphone jack 130 may be disposed on the rear surface of the front case 101. A third manipulation unit 123c capable of obtaining fingerprint information may be connected to the main circuit board 181.

The rear case 102 may provide a space in which the electronic components can be seated. The rear case 102 may form at least a part of the rear surface of the mobile terminal 10. The rear case 102 may form at least a part of the lateral surface of the mobile terminal 10.

The display unit 151 may include a window 151a and a display panel 151b. A touch circuit board 135 and a display circuit board 131 may be connected to the display panel 151b. The display unit 151 may be accommodated in the front case 101. The touch circuit board 135 and the display circuit board 131 may be connected to the main circuit board 181. The battery accommodating portion 192 may be formed on the rear surface of the front case 101 and receive the battery 191.

Figure 4:
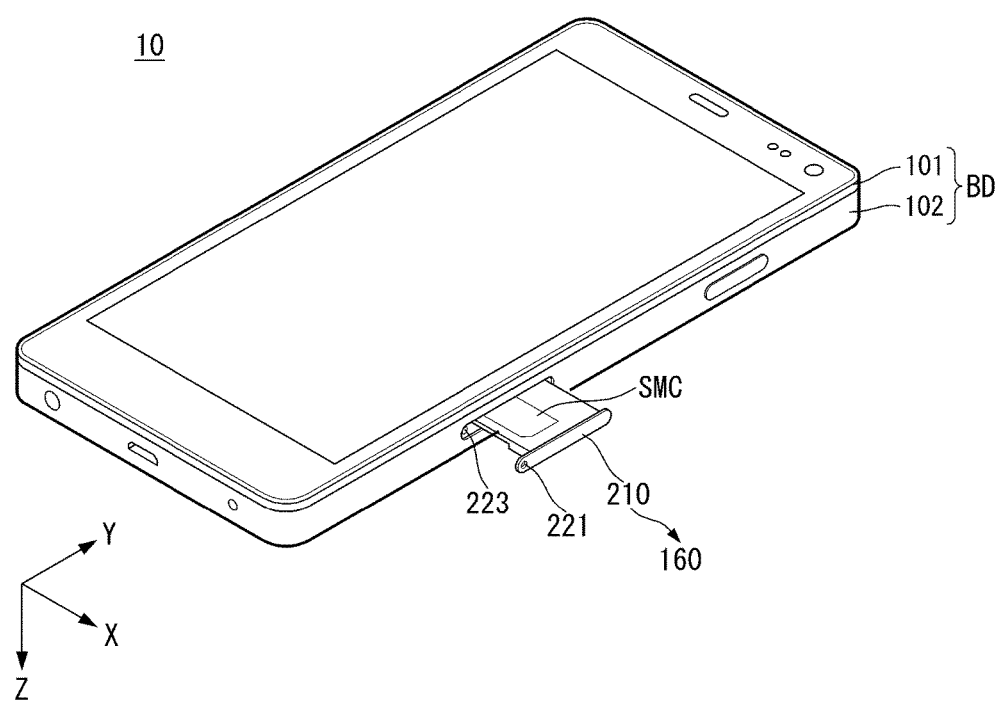
FIG. 4 is a view showing a state in which the SIM tray is pulled out of the body.

FIG. 4 is a view showing a state in which the SIM tray is pulled out of the body BD. An eject pin (not shown) may be inserted into the SIM tray hole 221. The eject pin inserted into the SIM tray hole 221 may be inserted into the body hole 223 formed in the body BD.

The eject pin inserted into the body hole 223 formed in the body BD may apply a force to a housing at which the SIM tray 210 is placed. By using the force applied by the eject pin, the housing may discharge the SIM tray 210 out of the mobile terminal 10.

The SIM tray 210 may mount an IC chip or the like. The SIM tray 210 may, for example, load a SIM card SMC. The SIM card SMC may include information regarding the user of the mobile terminal 10 and the like. The SIM card SMC may be replaceable in the SIM tray 210.

The body hole 223 may be passed by the eject pin. Liquid may flow into the interior of the mobile terminal 10 from outside the mobile terminal 10 through the body hole 223. Liquid that may enter the interior of the mobile terminal 10 may include, for example, water. A waterproof function of the body hole 223 may be required for waterproofing the mobile terminal 10. The body hole 223 may be referred to as a body opening 223. The body hole 223 may be referred to as a waterproof hole 223.

Figure 5:
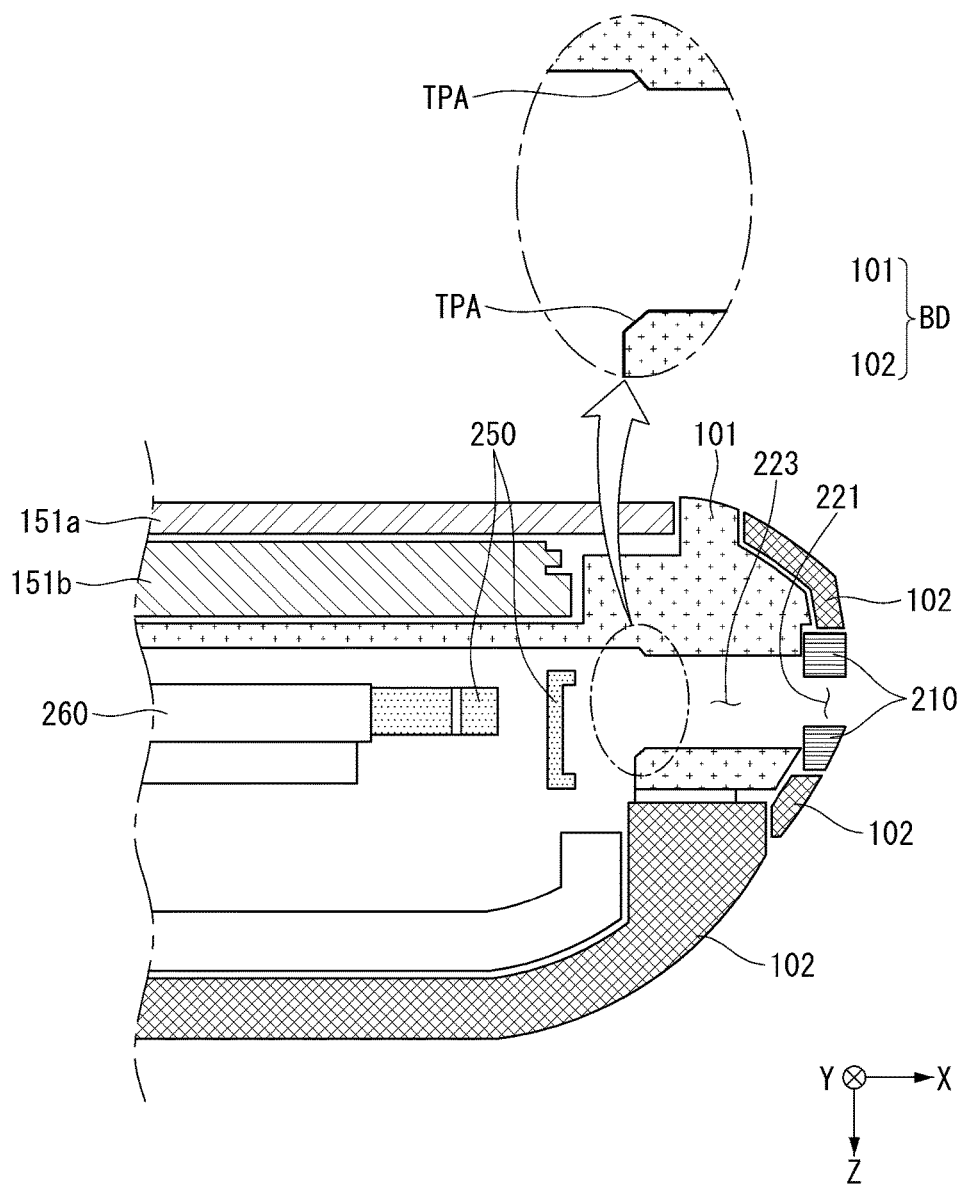
FIG. 5 is a cross-sectional view of the mobile terminal taken along line A-A' in FIG. 1.

FIG. 5 is a cross-sectional view of the mobile terminal taken along line A-N in FIG. 1. FIG. 5 is a cross section cut from the front surface to the rear surface of the mobile terminal. A-A' which serves as a reference of the cross section, passes through the SIM tray hole 221 and may be parallel to the moving direction of the SIM tray 210.

The body hole 223 may be formed on one side of the body BD. The body hole 223 may be formed on one side of the front case 101, for example. The body hole 223 may communicate with the SIM tray hole 221. One end of the body hole 223 may face the SIM tray hole 221 and the other end of the body hole 223 may face the inside of the mobile terminal 10. The SIM tray hole 221 may be referred to as a SIM tray opening 221.

The SIM housing 260 may be located in the body BD. The SIM housing 260 may seat the SIM tray 210. The SIM housing 260 may load the SIM tray 210. The SIM housing 260 may provide a space for the SIM tray 210 to move in and out of the mobile terminal 10.

A force transmitting member 250 may be located in the body BD. The force transmitting member 250 may be adjacent to the body hole 223. An eject pin (not shown) which pass through the SIM tray hole 221 and the body hole 223, may transmit a force to the force transmitting member 250. The force transmitting member 250 may be connected to the SIM housing 260. The force transmitting member 250 may move in the SIM housing 260. The force transmitting member 250 may transmit force to the SIM housing 260. The force transmitting member 250 may be related to the discharge of the SIM tray 210. For example, as the force transmitting member 250 moves, the SIM housing 260 may eject at least a portion of the SIM tray 210 from the body BD.

The body hole 223 may provide a space for connecting the inside and the outside of the mobile terminal 10, as the SIM tray hole 221 does. Liquid or the like can be introduced into the inside of the mobile terminal 10 from the outside through the body hole 223. With the SIM tray 210 seated in the SIM housing 260, a component capable of shielding the body hole 223 can be considered.

The body hole 223 may form a tapered area TPA at one end adjacent to an inside of the body BD. When a component capable of shielding the body hole 223 is fitted into the body hole 223, the tapered area TPA may guide the component into the body hole 223.

Figure 6:
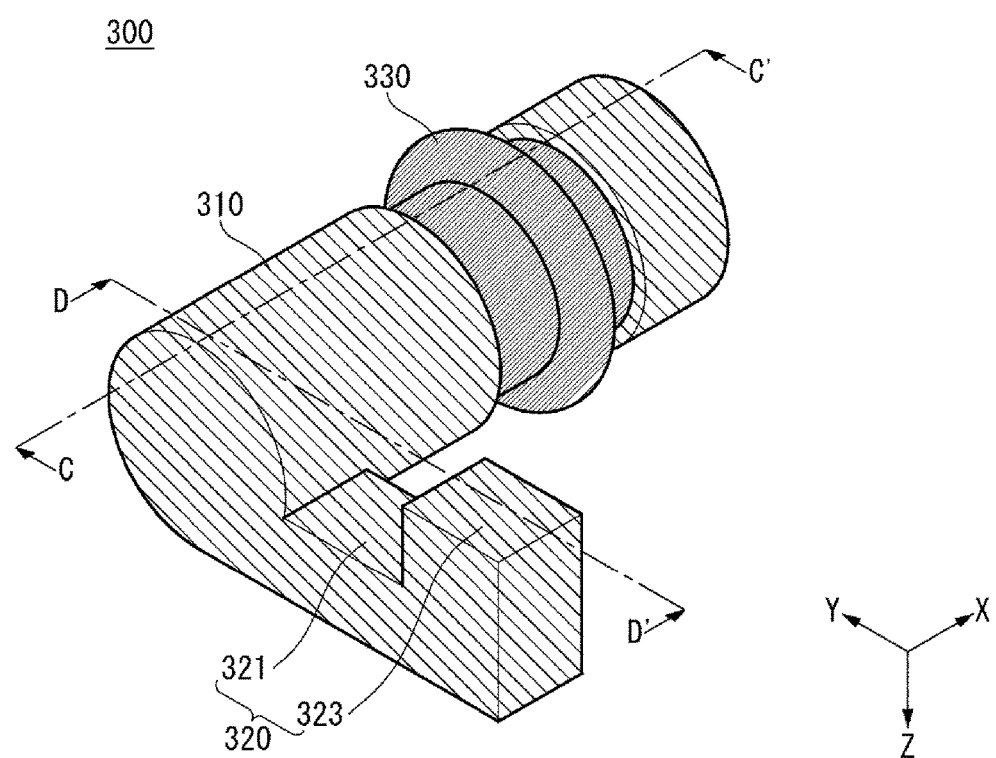
FIGS. 6 to 12 are views illustrating an waterproof unit according to a first embodiment of the present invention.
Figure 7:
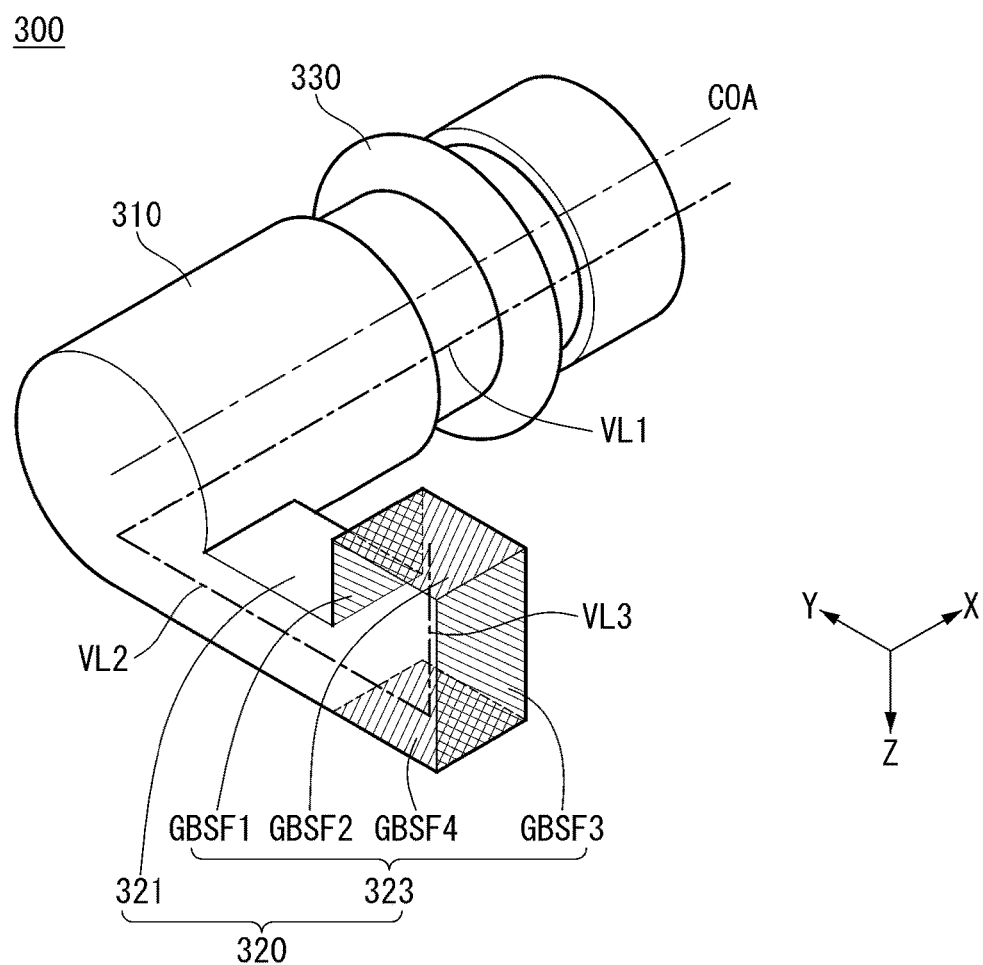

FIGS. 6 and 7 are views showing a waterproof unit according to a first embodiment of the present invention. Referring to FIG. 6, the waterproof unit 300 according to an embodiment of the present invention may include a waterproof unit body 310, a first guide portion 320, and a packing portion 330. The waterproof unit 300 can shield the body hole 223 (see FIG. 5). The waterproof unit 300 can shield the body hole 223 (see FIG. 5) at one location of the body hole 223.

The waterproof unit body 310 may be located in the body hole 223 (see FIG. 5). The waterproof unit body 310 may be available to move in the body hole 223. The waterproof unit body 310 may be available to move along the longitudinal direction of the body hole 223. The longitudinal direction of the body hole 223 may be substantially parallel to the moving direction of the SIM tray 210 (see FIGS. 4 and 5). At least a portion of the waterproof unit body 310 may be located inside the body hole 223 (see FIG. 5). At least a portion of the waterproof unit body 310 may move within the body hole 223. The waterproof unit 300 may be referred to as a waterproof pin 300. The waterproof pin 300 may be referred to as a pin 300.

The waterproof unit body 310 may have a shape corresponding to the shape of the body hole 223 (see FIG. 5). The cross section of the waterproof unit body 310 may correspond to the shape of the cross section of the body hole 223 (see FIG. 5). The waterproof unit body 310 may have, for example, a cylinder shape. A part of the waterproof unit body 310 may have a concave shape in a direction toward the inside of the waterproof unit body 310.

Referring to FIG. 7, the waterproof unit body 310 may form a virtual center line COA along the longitudinal direction of the waterproof unit body 310. The virtual center line COA may form an axis of the waterproof unit body 310 when the waterproof unit body 310 is in the shape of a cylinder. The virtual center line may be in the longitudinal direction of the waterproof unit body 310.

The waterproof unit body 310 may form a first virtual line VL1 parallel to the virtual center line COA. The first guide portion 320 may extend from one point of the first virtual line VL1.

The packing portion 330 may be connected to the waterproof unit body 310. The packing portion 330 may have a shape to surround the waterproof unit body 310. The packing portion 330 may wrap the circumference of the waterproof unit body 310 in an azimuthal direction with respect to the longitudinal direction of the waterproof unit body 310. The packing portion 330 may be located in the concave region of the waterproof unit body 310.

The first guide portion 320 may be connected to one side of the waterproof unit body 310. The first guide portion 320 may extend from the waterproof unit body 310. It may be available for the first guide portion 320 to guide the movement of the waterproof unit body 310 inside the body hole 223 (see FIG. 5). The first guide portion 320 may include a guide connection portion 321 and a guide bending portion 323.

The guide connection portion 321 may extend from the waterproof unit body 310. The guide connection portion 321 may extend toward a lateral side with respect to the longitudinal direction of the waterproof unit body 310. For example, when the longitudinal direction of the waterproof unit body 310 is parallel to a direction of X axis, the guide connection portion 321 may extend from one side of the waterproof unit body 310 in parallel with a direction of Y axis. The guide connection portion 321 may connect the waterproof unit body 310 and the guide bending portion 323.

The guide connection portion 321 may be formed to extend from one point of the first virtual line VL1. The guide connection portion 321 may form a second virtual line VL2 parallel to the direction in which the guide connection portion 321 extends. The second virtual line VL2 may pass through the center of the guide connection portion 321. The second virtual line VL2 may meet with the first virtual line VL1.

The guide connection portion 321 may form a plane with the waterproof unit body 310. The plane formed by the waterproof unit body 310 and the guide connection portion 321 may be a plane formed by a virtual line parallel to the longitudinal direction of the waterproof unit body 310 and a virtual line parallel to the longitudinal direction of the guide connection portion 321. For example, the plane formed by the waterproof unit body 310 and the guide connection portion 321 may be a plane formed by the first virtual line VL1 and the second virtual line VL2. For example, the plane formed by the waterproof unit body 310 and the guide connection portion 321 may be parallel to the XY plane.

The guide bending portion 323 may extend from the guide connection portion 321. The guide bending portion 323 may be formed bent at the guide connection portion 321. The guide bending portion 323 may form an angle with the guide connection portion 321.

The guide bending portion 323 may extend from the guide connection portion 321 in a direction not parallel to the longitudinal direction of the waterproof unit body 310. For example, the guide bending portion 323 may extend from the guide connection portion 321 in a direction perpendicular to the longitudinal direction of the waterproof unit body 310.

The guide bending portion 323 may extend from the guide connection portion 321 in a direction not parallel to the longitudinal direction of the guide connection portion 321. For example, the guide bending portion 323 may extend from the guide connection portion 321 in a direction perpendicular to the longitudinal direction of the guide connection portion 321. The longitudinal direction of the guide connection portion 321 may be a direction in which the guide connection portion 321 extends from the waterproof unit body 310.

The guide bending portion 323 may extend from the guide connection portion 321 in a direction not parallel to the plane formed by the waterproof unit body 310 and the guide connection portion 321. For example, the guide bending portion 323 may extend from the guide connection portion 321 in a direction perpendicular to the plane formed by the waterproof unit body 310 and the guide connection portion 321.

The guide bending portion 323 may be formed extending from one point of the second virtual line VL2. The guide bending portion 323 may form a third virtual line VL3 parallel to the direction in which the guide bending portion 323 extends. The third virtual line VL3 may pass through the center of the guide bending portion 323. The third virtual line VL3 may meet with the second virtual line VL2.

The guide bending portion 323 may form a plane with the guide connection section 321. The plane formed by the guide bending portion 323 and the guide connection portion 321 may be formed by a virtual line parallel to the extending direction of the guide connection portion 321 and a virtual line parallel to the extending direction of the guide bending portion 323. For example, the plane formed by the guide connection portion 321 and the guide bending portion 323 may be a plane formed by the second virtual line VL2, and the third virtual line VL3. For example, the plane formed by the guide bending portion 323 and the guide connection portion 321 may be parallel to the YZ plane.

The plane formed by the guide bending portion 323 and the guide connection portion 321 may not be parallel to the plane formed by the guide connection portion 321 and the waterproof unit body 310. For example, the plane formed by the guide bending portion 323 and the guide connection portion 321 may be perpendicular to the plane formed by the guide connection portion 321 and the waterproof unit body 310.

The guide bending portion 323 may form a plurality of surfaces. For example, the surfaces formed at the guide bending portion 323: a first guide bending surface GBSF1, a second guide bending surface GBSF2, a third guide bending surface GBSF3, and a fourth guide bending surface GBSF4. At least one of the first to fourth guide bending surfaces GBSF1, GBSF2, GBSF3, and GBSF4 formed on the guide bend portion 323 may be related to a second guide portion to be described later.

The first guide bending surface GBSF1 may be adjacent to the guide connection portion 321. The first guide bending surface GBSF1 may face the waterproof unit body 310. The first guide bending surface GBSF1 may include a part of a plane and/or a part of a curved surface. The first guide bending surface GBSF1 may be parallel to the longitudinal direction of the waterproof unit body 310. The first guide bending surface GBSF1 may be parallel to the first virtual line VL1. The first guide bending surface GBSF1 may be parallel to the third virtual line VL3.

The second guide bending surface GBSF2 may be bent and extend from the first guide bending surface GBSF1. The second guide bending surface GBSF2 may include a part of a plane and/or a part of a curved surface. The second guide bending surface GBSF2 may be parallel to the longitudinal direction of the waterproof unit body 310. The second guide bending surface GBSF2 may be parallel to the first virtual line VL1. The second guide bending surface GBSF2 may be aligned with the extending direction of the guide connection portion 321. The second guide bending surface GBSF2 may be parallel to the second virtual line VL2. The second guide bending surface GBSF2 may not be parallel to the extending direction of the guide bending portion 323. For example, the second guide bending surface GBSF2 may be perpendicular to the third virtual line VL3.

The second guide bending surface GBSF2 may form an angle with the first guide bending surface GBSF1. The angle formed by the second guide bending surface GBSF2 with the first guide bending surface GBSF1 may be a right angle. The second guide bending surface GBSF2 may be formed integrally with the first guide bending surface GBSF1. For example, the second guide bending surface GBSF2 may be formed at an angle of 180 degrees with the first guide bending surface GBSF1. For another example, the second guide bending surface GBSF2 and the first guide bending surface GBSF1 may form a round shape integrally.

The third guide bending surface GBSF3 may be bent and extend from the second guide bending surface GBSF2. The third guide bending surface GBSF3 may include a part of a plane and/or a part of a curved surface. The third guide bending surface GBSF3 may be aligned with the first guide bending surface GBSF1. The third guide bending surface GBSF3 may be oriented in a direction opposite to the direction in which the first guide bending surface GBSF1 is oriented. The third guide bending surface GBSF3 may face in a direction in which the guide connection portion 321 extends from the waterproof unit body 310. For example, the third guide bending surface GBSF3 may be oriented in the direction in which the second virtual line VL2 faces.

The third guide bending surface GBSF3 may form an angle with the second guide bending surface GBSF2. The angle formed by the third guide bending surface GBSF3 and the second guide bending surface GBSF2 may be a right angle, for example. The third guide bending surface GBSF3 may be formed integrally with the second guide bending surface GBSF2. For example, the third guide bending surface GBSF3 may be formed at an angle of 180 degrees with the second guide folded surface GBSF2. For another example, the third guide bending surface GBSF3 and the second bending surface GBSF2 may form a round shape integrally.

The fourth guide folded surface GBSF4 may be bent and extend from the third guide bending surface. The fourth guide bending surface GBSF4 may include a part of the plane and/or a part of the curved surface. The fourth guide bending surface GBSF4 may be aligned with the second guide bending surface GBSF2. The fourth guide bending surface GBSF4 may be parallel to the longitudinal direction of the waterproof unit body 310. The fourth guide bending surface GBSF4 may be aligned with the first virtual line VL1.

The fourth guide bending surface GBSF4 may form an angle with the third guide bending surface GBSF3. The angle formed by the fourth guide bending surface GBSF4 and the third guide bending surface GBSF3 may be a right angle, for example.

Figure 8:
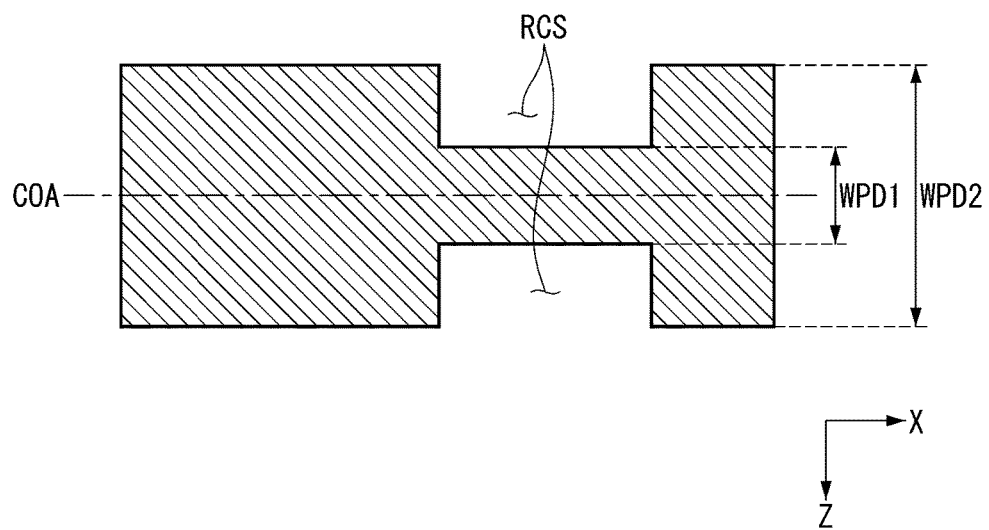
Figure 9:
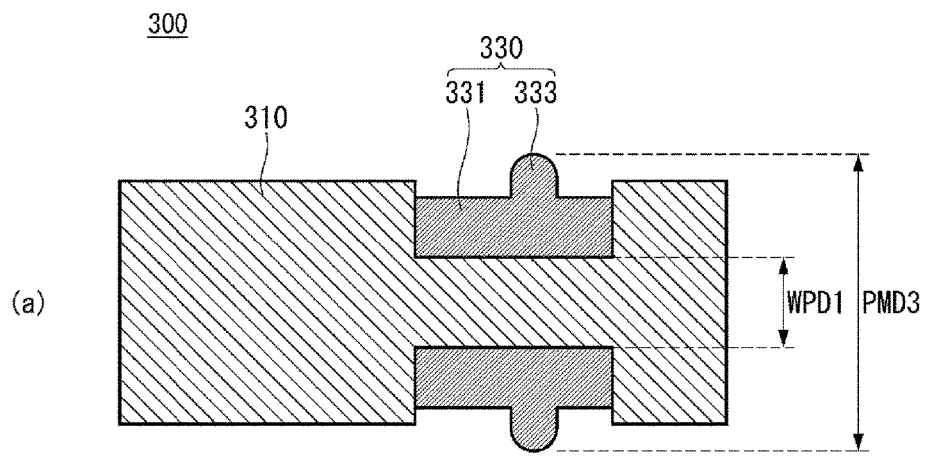
Figure 9:
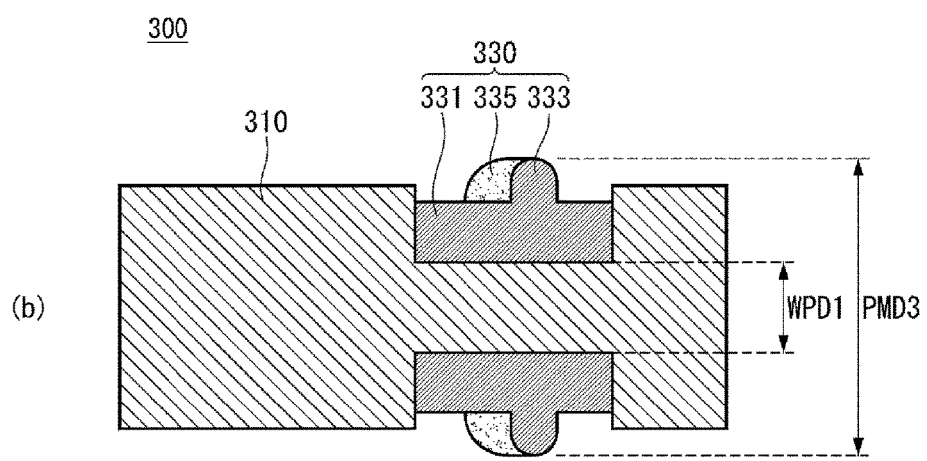

FIGS. 8 and 9 are cross-sectional views of the waterproof unit taken along line C-C' of FIG. 6. C-C' may be parallel to the longitudinal direction of the waterproof unit body 310. Referring to FIG. 8, a cross-sectional view of the waterproof unit 300 may be observed in a state where the packing portion 330 is removed. The cross section of the waterproof unit body 310 may be shown in FIG. 8.

The waterproof unit body 310 may have a cylinder shape. The waterproof unit body 310 may include a virtual center line COA. The virtual center line COA may form an axis of the waterproof unit body 310.

The waterproof unit body 310 may form a concave portion RCS on one side. The concave portion RCS may be referred to as a recess portion RCS. The concave portion RCS may have a concave shape as compared with the other surface neighboring the concave portion RCS. The concave portion RCS may provide a space in which the packing portion 330 is fitted. The diameter of the waterproof unit body 310 at the concave portion RCS may be a first waterproof unit body diameter WPD1. The first waterproof unit body diameter WPD1 may mean the average diameter of the concave portion RCS.

The outer diameter of the waterproof unit body 310 may be a second waterproof unit body diameter WPD2. The second waterproof unit body diameter WPD2 may mean an average diameter of the waterproof unit body 310 excluding the concave portion RCS. The second waterproof unit body diameter WPD2 may be greater than the first waterproof unit body diameter WPD1.

Referring to FIG. 9, the packing portion 330 may be fitted into the concave portion RCS of the waterproof unit body 310.

Referring to FIG. 9 (a), the packing portion 330 may include a packing portion body 331 and a packing ring 333.

The packing portion body 331 may be fitted in the concave portion RCS of the waterproof unit body 310. The packing ring 333 may extend toward the outside of the packing portion 330 from the packing portion body 331. The outer diameter of the packing portion 330 may be a third packing portion diameter PMD3. The third packing portion diameter PMD3 may be the diameter of the packing portion 330 inserted into the body hole 223 (see FIG. 5). The packing portion 330 may include a stretchable material. When the packing portion 330 is inserted into the body hole 223 (see FIG. 5), the third packing portion diameter PMD3 may be changed corresponding to the diameter of the body hole 223.

Referring to FIG. 9 (b), the packing portion 330 may include a packing support portion 335. The packing support portion 335 may be formed on the outer surface of the packing portion body 331. The packing support portion 335 may be in contact with the packing ring 333. The packing support portion 335 may be positioned at the boundary between the packing portion body 331 and the packing ring 333. The packing support portion 335 may support the packing ring 333. The packing support portion 335 may receive the amount of impact from the packing ring 333 and transfer it to the packing portion body 331.

Figure 10:
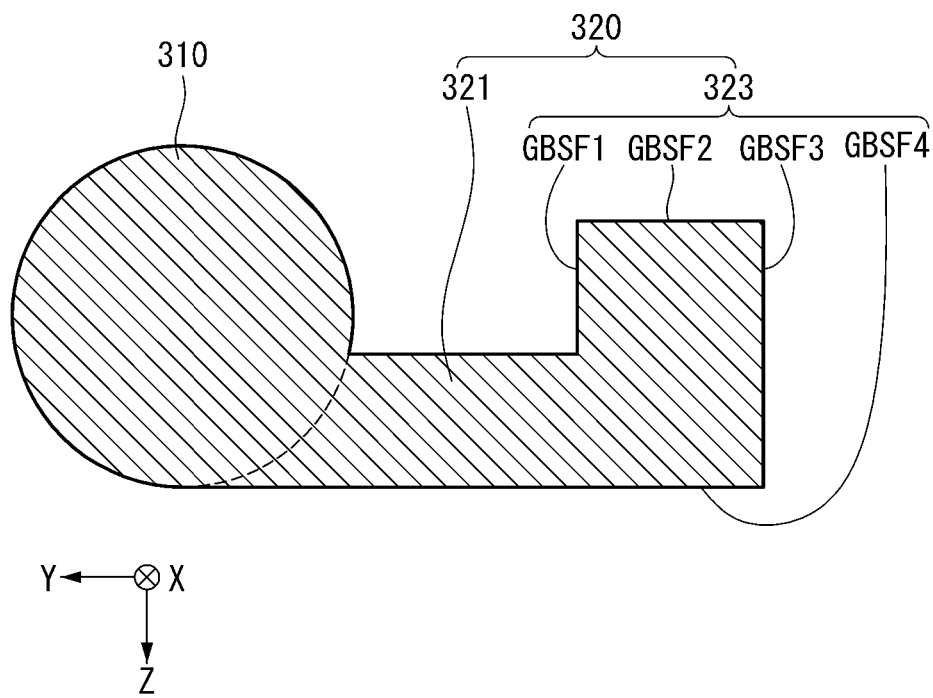

FIG. 10 is a sectional view of the waterproof unit taken along the line D-D' of FIG. 6. D-D' may be aligned with the extending direction of the guide connection portion 321. The cross section of the waterproof unit 300 shown in FIG. 10 may be a view of the waterproof unit 300 seen from the direction of movement of the waterproof unit 300.

The second guide portion (described later) for guiding the waterproof unit 300 may have a shape corresponding to the cross sectional shape of the first guide portion 320. For example, the second guide portion may form surfaces facing at least three surfaces among the first to fourth guide bending surfaces GBSF1, GBSF2, GBSF3, GBSF4, and GBSF1 formed on the guide bending portion 323. For another example, the second guide portion may form surfaces facing at least two surfaces among the first to fourth guide bending surfaces GBSF1, GBSF2, GBS3, and GBSF4 formed on the guide bend portion 323.

Figure 11:
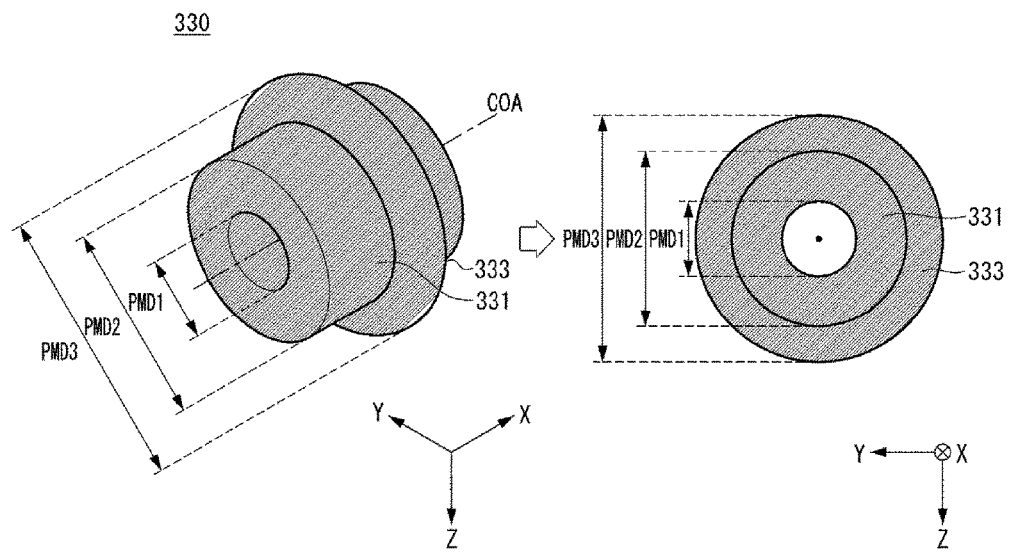
Figure 11:
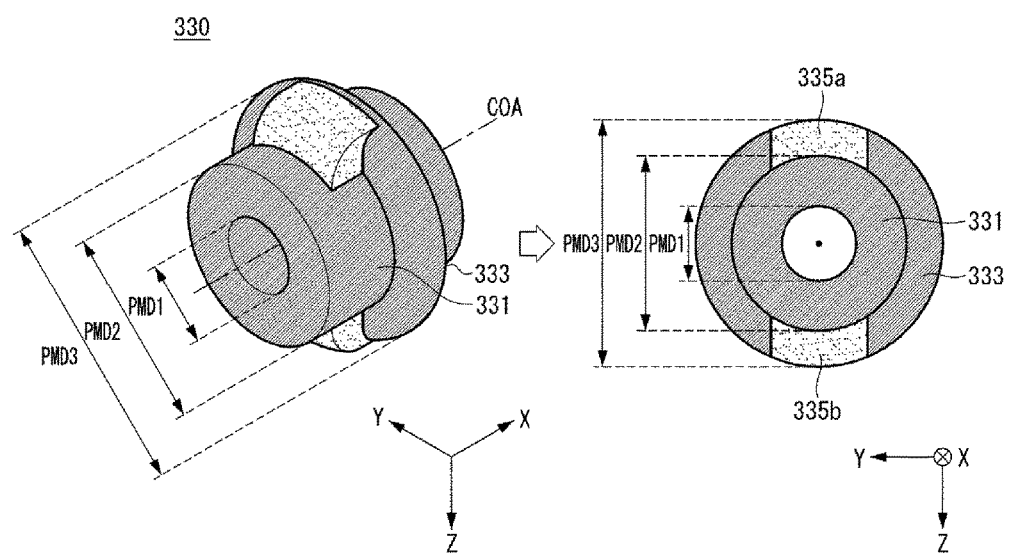

Referring to FIG. 11 (a), the virtual center line COA may form an axis of the packing portion 330. The packing portion 330 may include a stretchable material. The packing portion 330 may include a polymer material. The packing portion 330 may include a rubber material. The packing portion 330 may include a silicon material. The packing portion 330 may include a polyurethane material. The packing portion 330 may include a thermoplastic urethane material. The first to third packing portion diameters PMD1, PMD2 and PMD3 may represent numerical values in a state in which the packing portion 330 is not connected to the waterproof unit body 310 (see FIG. 7).

The packing portion body 331 may form a hollow portion therein. The hollow portion formed in the packing portion body 331 may provide a space in which the waterproof unit body 310 is fitted. The hollow portion of the packing portion body 331 may form the first packing portion diameter PMD1. The first packing portion diameter PMD1 may correspond to the first waterproof unit body diameter (WPD1, see FIG. 8). For example, the first packing portion diameter PMD1 may be equal to or smaller than the first waterproof unit body diameter (WPD1, see FIG. 8). The outer diameter of the packing portion body 331 may be the second packing portion diameter PMD2. The second packing portion diameter PMD2 may be larger than the first packing portion diameter PMD1. The second packing portion diameter PMD2 may be equal to or smaller than the second waterproof unit body diameter WPD2.

The packing ring 333 may be formed along the outer periphery of the packing portion body 331. When the packing portion 330 enters the body hole 223 (see FIG. 5), the packing ring 333 may contact an inner surface of the body hole 223 (see FIG. 5). The outer diameter of the packing ring 333 may be the third packing portion diameter PMD3. The third packing portion diameter PMD3 may be greater than the inner diameter of the body hole 223 (see FIG. 5). The outer diameter of the packing ring 333 may be equal to or smaller than the third packing portion diameter PMD3 when the packing portion 330 is located inside the body hole 223 (see FIG. 5).

Referring to FIG. 11 (b), the packing support portion 335 may be located on the outer surface of the packing portion body 331. A plurality of packing support portions 335 may be provided. The packing support portion 335 may be located on one side of the packing ring 333. For example, the packing support portion 335 may be positioned in relation to the direction in which the packing portion 330 is inserted into the body hole 223 (see FIG. 5). For example, the packing support portion 335 may be positioned behind the packing ring 333 in the direction in which the packing portion 330 is inserted into the body hole 223 (see FIG. 5).

The plurality of packing support portions 335 may be disposed on the packing portion body 331 at regular intervals. For example, two packing support portions 335a, 335b may be arranged in the circumferential direction of the packing portion body 331 at intervals of 180 degrees. For example, three packing support portions 335 may be disposed in the circumferential direction of the packing portion body 331 at intervals of 120 degrees. The circumferential direction of the packing portion body 331 may stand for an azimuthal direction with respect to the longitudinal direction of the waterproof unit body 310 (see FIG. 7)

The packing support portion 335 may absorb the impact of the packing ring 333. The durability of the packing portion 330 may be improved by the packing support portion 335.

Figure 12:
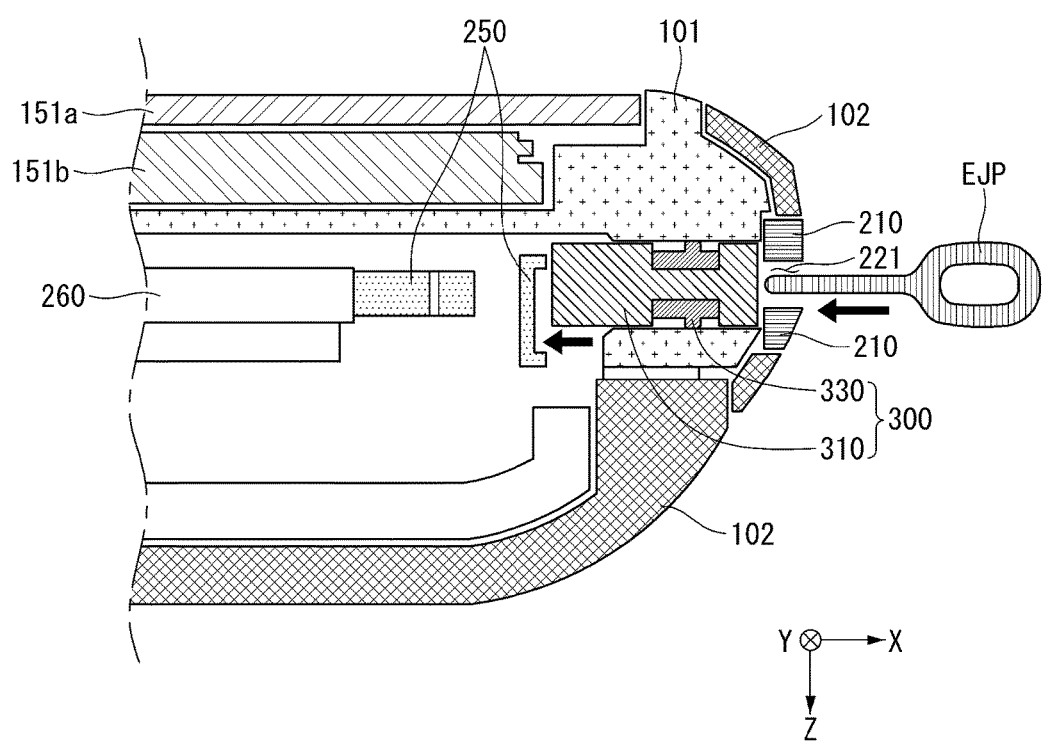

FIG. 12 is a view showing a state in which the waterproof unit is included in the mobile terminal. Referring to FIG. 12, at least a portion of the waterproof unit 300 may be located inside the body hole 223.

The waterproof unit 300 may shield or seal the body hole 223 at one location of the body hole 223. The one location at which the waterproof unit 300 shields or seals the body hole 223 may be a location where the packing portion 330 contacts the body hole 223. The location where the waterproof unit 300 shields or seals the body hole 223 may be a plurality of locations. The locations at which the waterproof unit 300 shields or seals the body hole 223 may be a certain section of the body hole 223.

At least a portion of the waterproof unit 300 may move inside the body hole 223. The waterproof unit 300 may move along the direction in which the body hole 223 is opened. The waterproof unit 200 may move along a direction from inside of the body 101 and 102 to outside of the body 101 and 102 or vice versa.

One end of the waterproof unit body 310 may face the SIM tray hole 221. The other end of the waterproof unit body 310 may be directed to the force transmitting member 250. The direction from the one end of the waterproof unit body 310 toward the other end of the waterproof unit body 310 may be parallel to the longitudinal direction of the waterproof unit body 310.

A pressure or force may be applied to the one end of the waterproof unit body 310 from the eject pin EJP. The arrow adjacent to the eject pin EJP in FIG. 12, may indicate the direction of the force or pressure that the eject pin EJP provides to the waterproof unit 300.

When the waterproof unit body 310 is provided with a force or pressure, the waterproof unit 300 may move along the opened direction of the body hole 223. The opening direction of the body hole 223 may be the longitudinal direction of the body hole 223. The body hole 223 may contribute to guide the waterproof unit 300 when the waterproof unit 300 moves. The direction in which the body hole 223 guides the waterproof unit 300 may be the longitudinal direction of the body hole 223. When the packing portion 330 contacts the inner surface of the body hole 223 uniformly, a waterproof effect may be expected. The packing portion 330 may be in contact uniformly with the inner surface of the body hole 223, when the waterproof unit body 310 maintains constant moving direction. A configuration to guide the waterproof unit body 310 with constant moving direction may be considered.

The force or pressure applied to the waterproof unit body 310 may be transmitted to the force transmitting member 250. The arrow adjacent to the force transmitting member 250 in FIG. 12 may indicate the direction of the force or pressure which the waterproof unit 300 provides to the force transmitting member 250.

The hollow portion formed inside the body hole 223 may be a shape of a cylinder. A rotation of the waterproof unit 300 in the azimuthal direction with respect to the longitudinal direction of the body hole 223 may occur when the waterproof unit 300 moves. When the waterproof unit 300 rotates in the azimuth direction with respect to the longitudinal direction of the body hole 223, the packing portion 330 may be twisted. When the packing portion 330 is twisted, the packing portion 330 may be damaged. A configuration for preventing rotation of the waterproof unit 300 in the body hole 223 may be considered.

FIGS. 13 to 16 are views showing a second guide unit according to a first embodiment of the present invention. As a structure for guiding the waterproof unit body 310 to move in a constant direction in the body hole 223 and a structure for preventing rotation of the waterproof unit 300 in the body hole 223, the first guide portion 320 and the second guide portion 400 may be considered.

Figure 13:
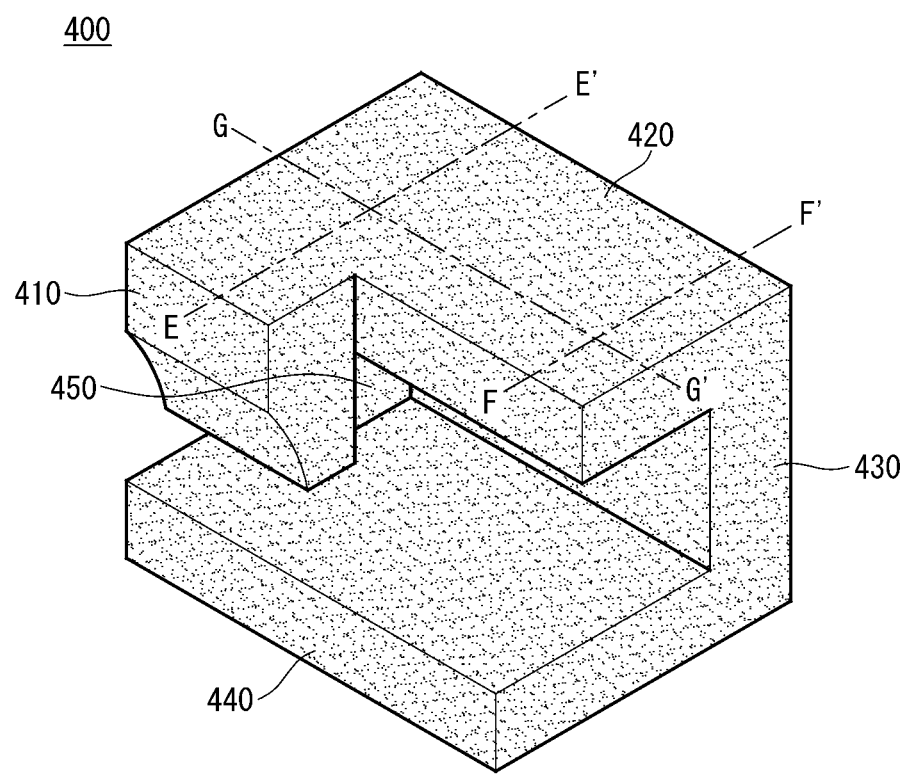
FIGS. 13 to 16 are views showing a second guide unit according to a first embodiment of the present invention.

FIG. 13 is a perspective view of the second guide portion 400. The second guide portion 400 may be positioned inside the body BD (see FIG. 5). The second guide portion 400 may be formed corresponding to the shape of the first guide portion 320 (see FIG. 7). The second guide unit 400 may be installed inside the body BD (see FIG. 5) and may be spaced apart from the waterproof unit body 310. The second guide portion 400 may be spaced apart from the body hole 223 (see FIG. 5).

The second guide portion 400 may include a plurality of guide walls for guiding the first guide portion 320. For example, the second guide portion 400 may include a first guide wall 410, a second guide wall 420, a third guide wall 430, and a fourth guide wall 440. At least two or three guide walls among the first to fourth guide walls 410, 420, 430 and 440 may guide the waterproof unit 300 by surrounding the first guide portion 320. The second guide portion 400 may include a stopper wall 450 connecting the second guide wall 420 and the fourth guide wall 440.

The first guide wall 410 may be formed to extend in the direction in which the body hole 223 is opened. The first guide wall 410 may extend in the longitudinal direction of the waterproof unit body 310. The first guide wall 410 may face the guide bending portion 323. The first guide wall 410 may be shorter in the longitudinal direction of the waterproof unit body 310 than the second to fourth guide walls 420, 430, and 440.

The second guide wall 420 may be bent and extend from the first guide wall 410. The second guide wall 420 may be extended in the longitudinal direction of the waterproof unit body 310.

The third guide wall 430 may be bent and extend from the second guide wall 420. The third guide wall 430 may extend in the longitudinal direction of the waterproof unit body 310. The third guide wall 430 may be spaced apart from the first guide wall 410.

The fourth guide wall 440 may be bent and extend from the third guide wall 430. The fourth guide wall 440 may be configured using a part of the body BD (see FIG. 5). The fourth guide wall 440 may be spaced apart from the second guide wall 420.

Figure 14:
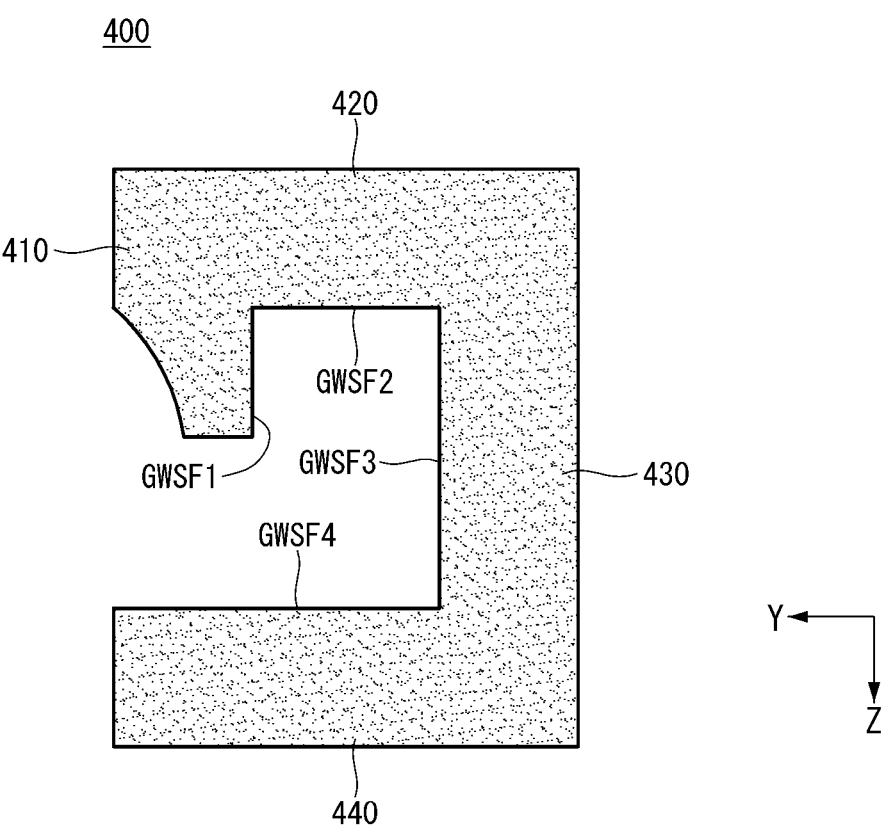

FIG. 14 is a cross-sectional view of the second guide portion taken along line E-E' of FIG. 13. Referring to FIG. 14, the second guide portion 400 may include first to fourth guide walls 410, 420, 430, and 440. The second guide portion 400 may include a surface that faces the first guide portion 320 (see FIG. 7).

The second guide portion 400 may include first to fourth guide wall surfaces GWSF1, GWSF2, GWSF3, and GWSF4 formed on the inner side of the second guide portion 400. The first to fourth guide wall surfaces GWSF1, GWSF2, GWSF3, and GWSF4 may be formed on the inner side of the first to fourth guide walls 410, 420, 430, and 440 sequentially. The first to fourth guide wall surfaces GWSF1, GWSF2, GWSF3 and GWSF4 may face the first guide portion 320 (see FIG. 7). The first to fourth guide wall surfaces GWSF1, GWSF2, GWSF3 and GWSF4 may form a space for guiding the first guide portion 320. The first to fourth guide wall surfaces GWSF1, GWSF2, GWSF3, and GWSF4 may be configured to surround the guide bending portion 323 (see FIG. 7).

Figure 15:
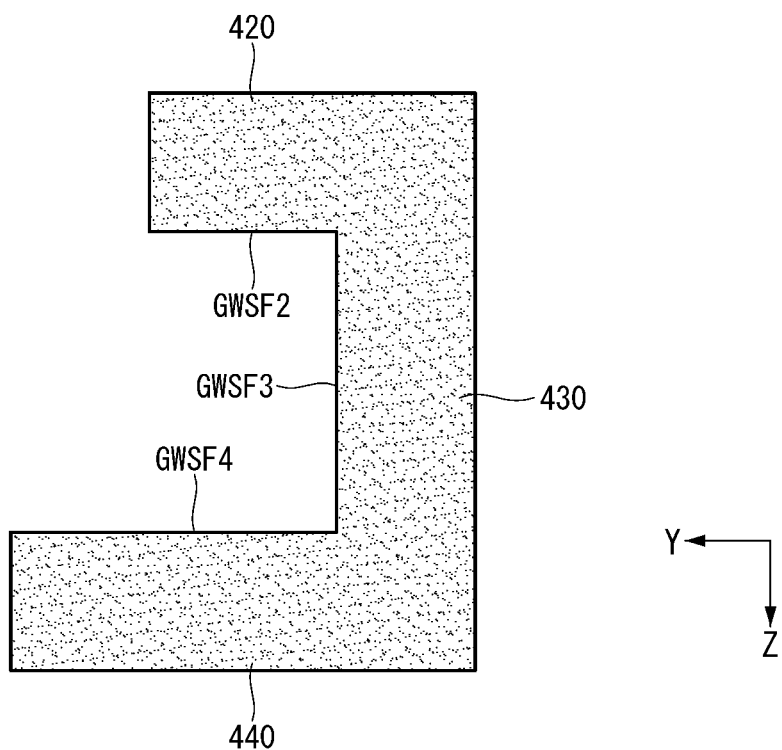

FIG. 15 is a sectional view of the second guide portion taken along line F-F' of FIG. 13. The second guide portion 400 may include first to third guide walls 410, 420, and 430 at a location in the longitudinal direction of the second guide portion 400. The longitudinal direction of the second guide portion 400 may be parallel to the longitudinal direction of the waterproof unit body 310.

Unlike the second guide portion 400 shown in FIG. 14, the second guide portion 400 may not include the first guide wall 410 at a location in the longitudinal direction. By doing so, a space for moving the force transmitting member 250 may be secured.

The second guide portion 400 may form second to fourth guide wall surfaces GWSF2, GWSF3, and GWSF4. The second to fourth guide wall surfaces GWSF2, GWSF3, and GWSF4 may face the first guide portion 320. The second to fourth guide wall surfaces GWSF2, GWSF3 and GWSF4 may form a space in which the first guide portion 320 is guided.

Figure 16:
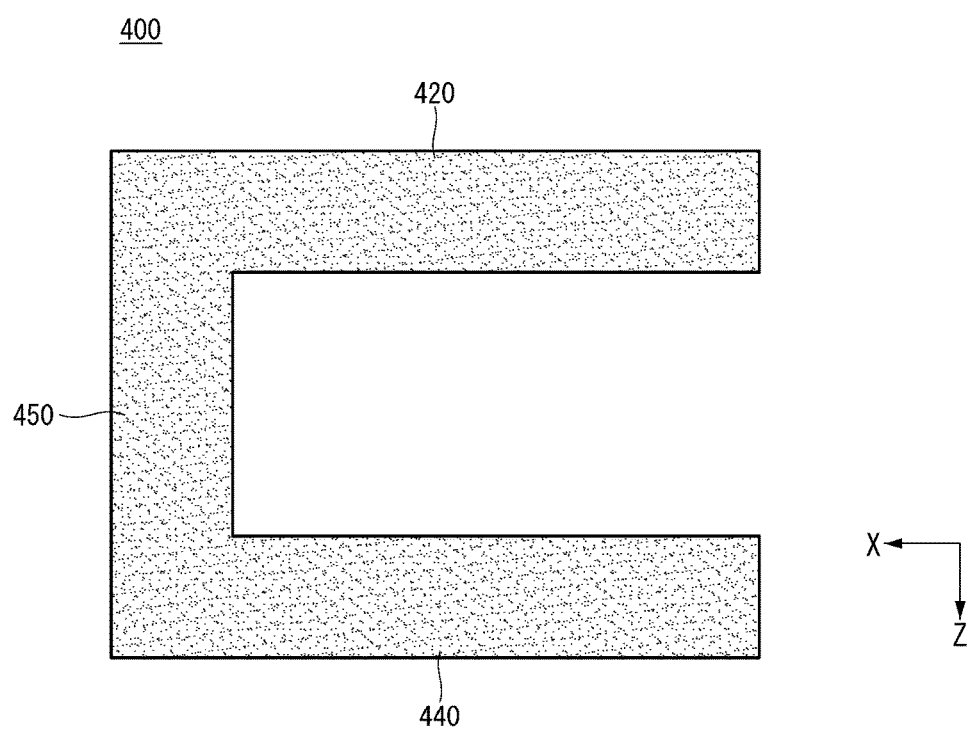

FIG. 16 is a cross-sectional view of the second guide portion taken along the line G-G' of FIG. 13. G-G' may indicate the direction in which the first guide portion 320 moves. The second guide portion 400 may include second and fourth guide walls 420 and 440. The second guide portion 400 may include a stopper wall 450 connecting the second guide wall 420 and the fourth guide wall 440.

The stopper wall 450 may be positioned at one end of the second guide wall 420 or the fourth guide wall 440. The stopper wall 450 may be configured as a part of the body BD (see FIG. 5). The stopper wall 450 may prevent the first guide portion 320 (see FIG. 7) from being drawn out to the outside. The stopper wall 450 may restrict movement of the first guide portion 320 (see FIG. 7) in the direction in which the first guide portion 320 is drawn out to the outside of the body BD (see FIG. 5).

Figure 17:
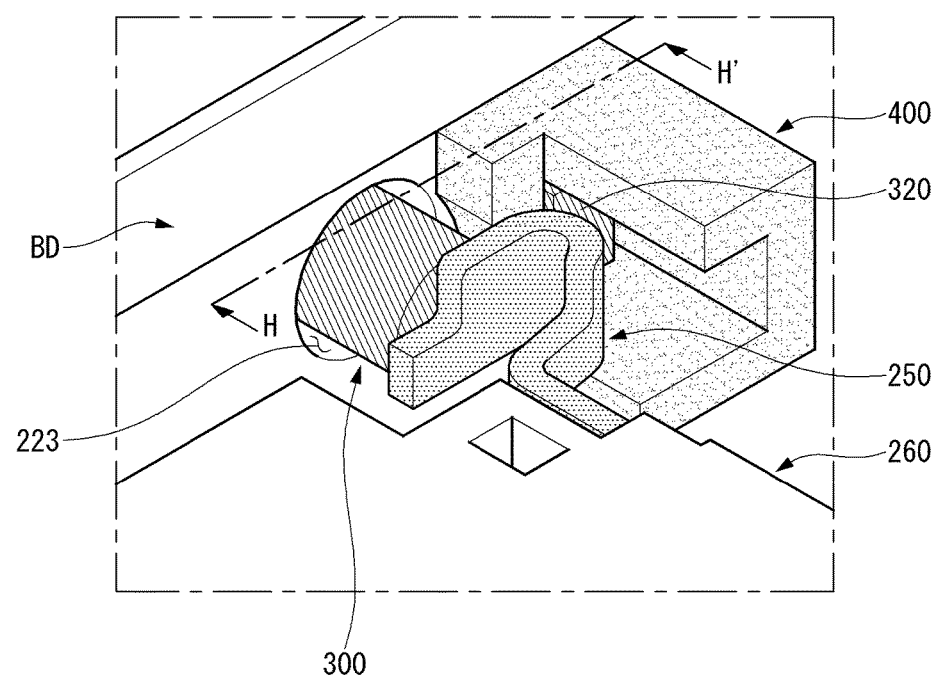
FIGS. 17 to 23 are views showing an operation of the waterproof unit according to the first embodiment of the present invention.

FIG. 17 is a view showing a state where the second guide portion is included in the mobile terminal. FIG. 17 is a perspective view of the waterproof unit 300 and the second guide unit 400 viewed from inside the body BD.

Referring to FIG. 17, the waterproof unit 300 may be in a state in which the body hole 223 is shielded or sealed while the SIM tray 210 (see FIG. 4) is drawn into the body BD. The waterproof unit 300 may be in a state of receiving a force or pressure from the force transmitting member 250 in a direction toward the outside from the inside of the body BD.

Figure 18:
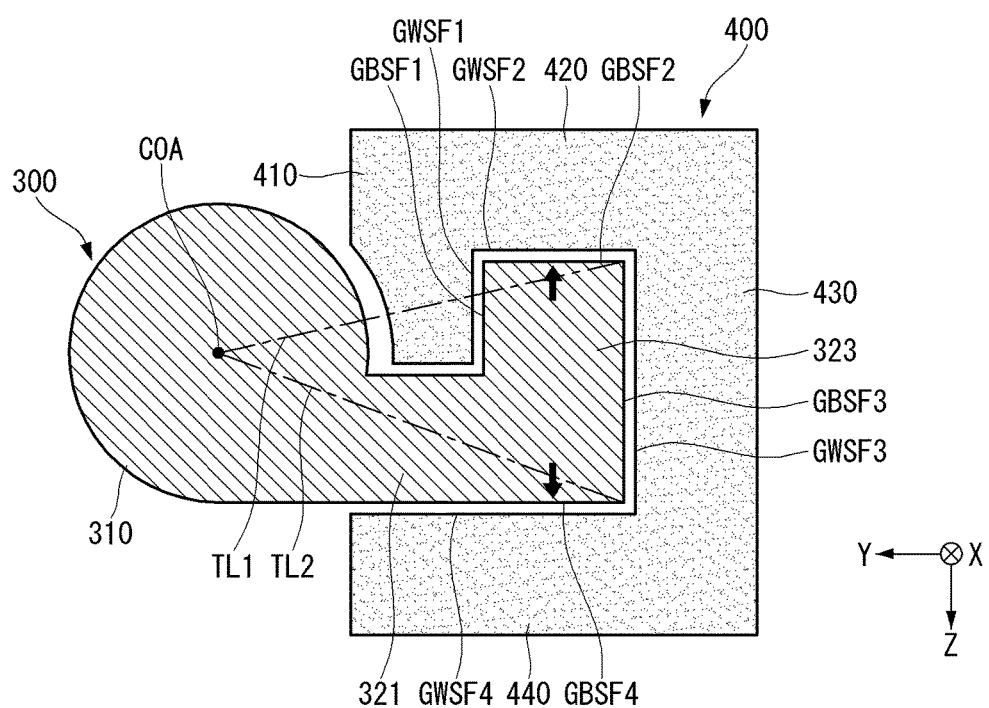

At least a part of the first guide portion 320 of the waterproof unit 300 may be surrounded by the second guide portion 400. The waterproof unit 300 may be stably positioned by the second guide portion 400. FIG. 18 is a cross-sectional view of the waterproof unit 300 and the second guide portion taken along the line H-H' of FIG. 17.

FIG. 18 is a cross-sectional view of the waterproof unit 300 and the second guide portion taken along the line H-H' of FIG. 17. FIG. 18 shows the relative position between the waterproof unit 300 and the second guide portion 400 when the waterproof unit 300 shields or seals the body hole 223. FIG. 18 shows the relationship between the waterproof unit 300 and the second guide portion 400 in a state in which the SIM tray 210 (see FIG. 4) is drawn into the body BD (see FIG. 4).

Referring to FIG. 18, the second guide portion 400 may cover at least a part of the first guide portion 320. The first to fourth guide walls 410, 420, 430 and 440 may guide the guide bending portion 323 while surrounding the guide bending portion 323.

The second guide portion 400 may form first to fourth guide wall surfaces GWSF1, GWSF2, GWSF3, and GWSF4. The first to fourth guide wall surfaces GWSF1, GWSF2, GWSF3 and GWSF4 may face the first to fourth guide bending surfaces GBSF1, GBSF2, GBSF3 and GBSF4, respectively.

When the waterproof unit body 310 is in the shape of a cylinder, the waterproof unit body 310 may form a virtual center line COA therein. The virtual center line COA may be the central axis of the waterproof unit body 310. When the waterproof unit body 310 is in the form of a column, the center line COA may be a line of center of mass.

It may be considered that the waterproof unit 300 receives force or pressure in an azimuthal direction with respect to the longitudinal direction of the waterproof unit body 310 from the outside. A virtual line segment from the virtual center line COA to a point where the second guide bending surface GBSF2 and the third guide bending surface GBSF3 meet, may be referred to as a first torque line TL1. A virtual line segment from the virtual center line COA to a point where the third guide bending surface GBSF3 and the fourth guide bending surface GBSF4 meet, may be referred to as a second torque line TL2.

The first torque line TL1 or the second torque line TL2 may be a distance from the virtual center line COA to a point where the first guide portion 320 and the second guide portion 400 meet. For example, when the waterproof unit body 310 receives a force to rotate counterclockwise from the outside, a suppressing force or torque by the second guide portion 400 may be applied to the waterproof unit body 310 along the first torque line TL1 in clockwise direction. For example, when the waterproof unit body 310 receives a force to rotate clockwise from the outside, a suppressing force or torque by the second guide portion 400 may be applied to the waterproof unit body 310 along the second torque line TL2 in counterclockwise direction. The first and second torque lines TL1 and TL2 may vary depending on the shapes of the first guide portion 320 and/or the second guide portion 400.

The second guide portion 400 may be spaced apart from the waterproof unit body 310. The extent to which the second guide portion 400 is spaced apart from the waterproof unit body 310 may correspond to a length of the guide connection portion 321. The length of the first and second torque lines TL1 and TL2 may correspond to the length of the guide connection portion 321.

The second guide bending surface GBSF2 and the second guide wall surface GWSF2 may face each other. There may be a clearance between the second guide bending surface GBSF2 and the second guide wall surface GWSF2. When the force or the pressure for rotating the waterproof unit body 310 in the counterclockwise direction is provided from the outside, the second guide bending surface GBSF2 may be provided with the force or the pressure upward as indicated an arrow adjacent to the second guide bending surface GBSF2. The second guide wall surface GWSF2 may prevent the second guide bending surface GBSF2 from moving when the second guide bending surface GBSF2 receives a force upward.

The clearance between the second guide bending surface GBSF2 and the second guide wall surface GWSF2 may be reduced by the force or pressure between the second guide bending surface GBSF2 and the second guide wall surface GWSF2. In other words, it may occur a difference in clearance between the first guide portion 320 and the second guide portion 400 due to a rotational force applied to the waterproof unit 300 from the outside.

The gap between the first guide portion 320 and the second guide portion 400 may cause rotation of the waterproof unit body 310. The amount of rotation of the waterproof unit body 310 caused by the gap between the first guide portion 320 and the second guide portion 400, may have negative correlation with the length of the first or second torque lines TL1 or TL2. For example, the amount of rotation of the waterproof unit body 310 generated by the clearance difference between the first guide portion 320 and the second guide portion 400, may be inversely proportional to the length of the first or second torque lines TL1 or TL2. As the amount of rotation of the waterproof unit body 310 is smaller, the torsion applied to the packing part 330 may be smaller. As the amount of rotation of the waterproof unit body 310 is smaller, the damage of the packing portion 330 may be reduced.

The lengths of the first and second torque lines TL1 and TL2 may correspond to the length of the guide connection portion 321 in the extended direction of the guide connection portion 321. The length of the guide connection portion 321 in the extended direction may correspond to the degree to which the second guide portion 400 is spaced apart from the waterproof unit body 310 and/or the body hole 223 (see FIG. 17). The guide connection portion 321 may contribute to a reduction in the amount of rotation of the waterproof unit body 310. Arrangement of the second guide portion 400 installed apart from the waterproof unit body 310 and/or the body hole 223 (see FIG. 17) may contribute to reduction of the rotation amount of the waterproof unit body 310.

Figure 19:
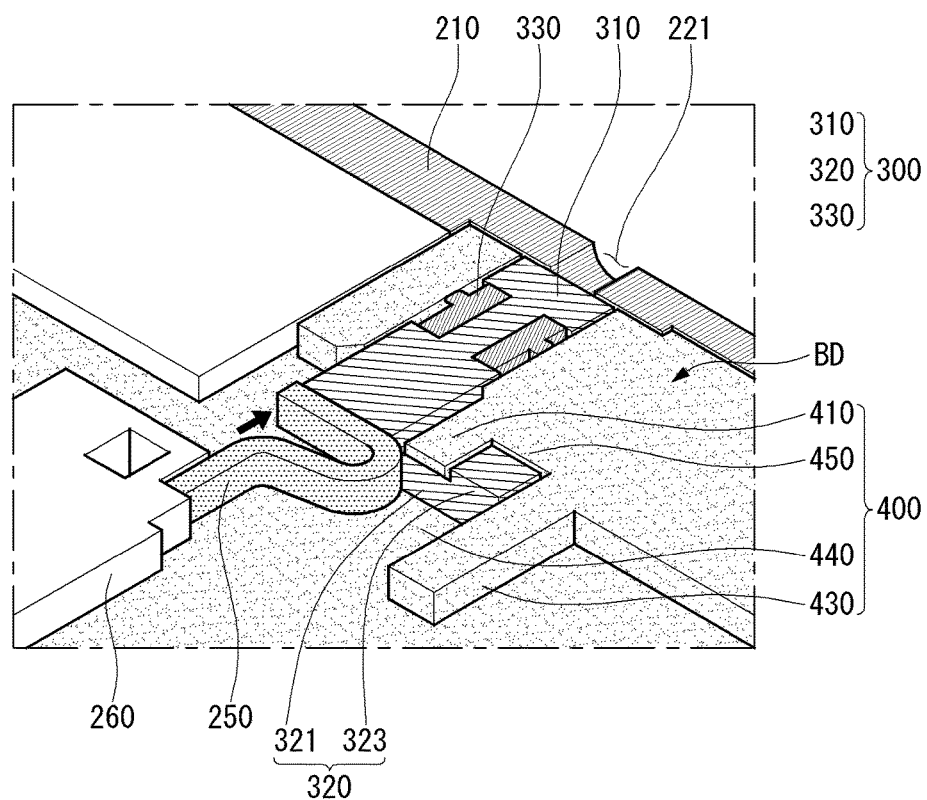

FIG. 19 is a cross-sectional view taken along line B-B' of FIG. 1. FIG. 19 may show a state where the waterproof unit and the second guide portion are provided on the mobile terminal. Referring to FIG. 19, the second guide wall 420 (see FIG. 18) may be cut out and not shown.

The force transmitting member 250 may be provided with a force from the SIM housing 260. The force transferred to the force transmitting member 250 from the SIM housing 260, may be caused by a spring installed in the SIM housing 260. The force transmitting member 250 may provide the waterproof unit 300 with a pushing force or pressure in the direction of the arrow shown in FIG. 19.

The stopper wall 450 of the second guide portion 400 may prevent the waterproof unit 300 from moving toward the outside of the body BD. In the absence of the stopper wall 450, the waterproof unit 300 may provide the force or pressure to the SIM tray 210 in the direction toward the outside of the body BD. The stopper wall 450 may contribute to the stable placement of the SIM tray 210.

Figure 20:
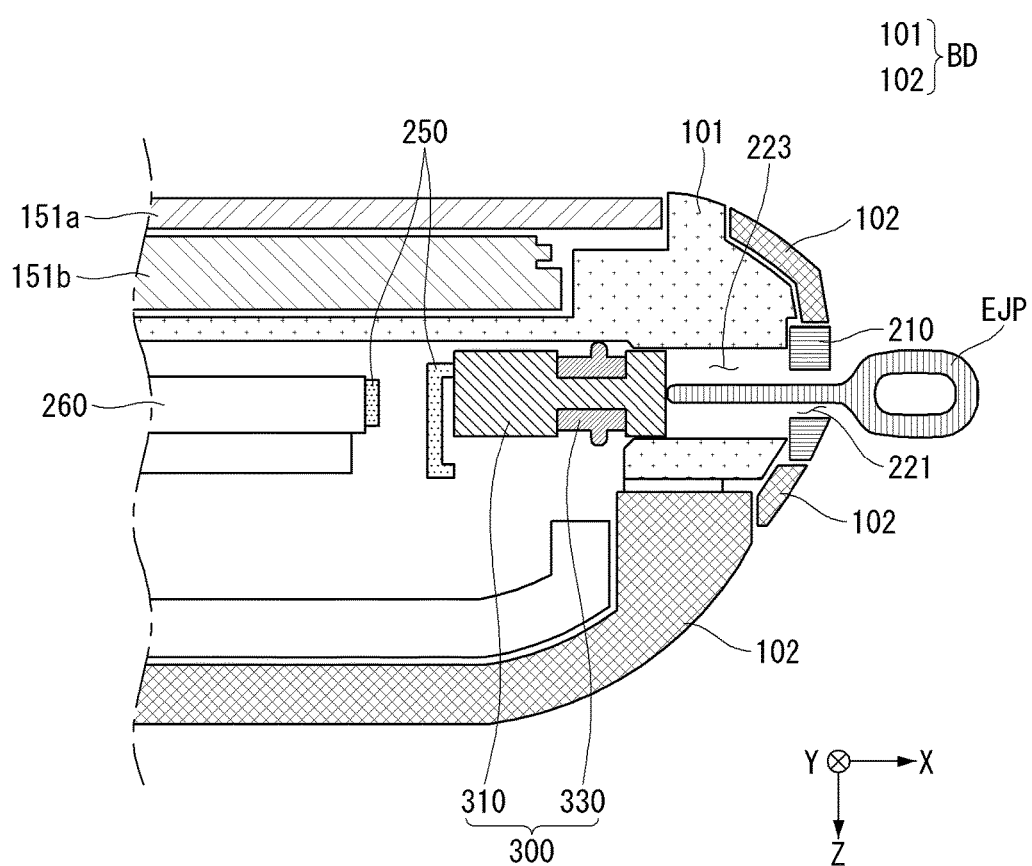

FIG. 20 may show that the waterproof unit is moved in the body hole 223. When the eject pin EJP applies a force or a pressure to the waterproof unit 300 in the direction toward the inside of the body BD, the waterproof unit 300 may move and apply force or pressure to the force transmitting member 250.

The waterproof unit 300 may move along the body hole 223 by a force or a pressure provided from the eject pin EJP. The waterproof unit 300 may be guided by the body hole 223 and/or the second guide unit 400 (see FIG. 19) when the waterproof unit 300 moves along the body hole 223.

The waterproof unit 300 may move and transmit a force or a pressure to the force transmitting member 250. The force transmitting member 250 may be moved in the inward direction of the body BD by the waterproof unit 300. The force or pressure that the eject pin EJP provides to the waterproof unit 300 may be greater than the force or pressure that the force transmitting member 250 provides to the waterproof unit 300.

When the force transmitting member 250 moves and provides a change to a component of the SIM housing 260, the SIM housing 260 may draw the SIM tray 210 out to the outside of the body BD. When the change is applied to the component of the SIM housing 260, the force or pressure that the force transmitting member 250 provides to the waterproof unit 300 may be interrupted.

Figure 21:
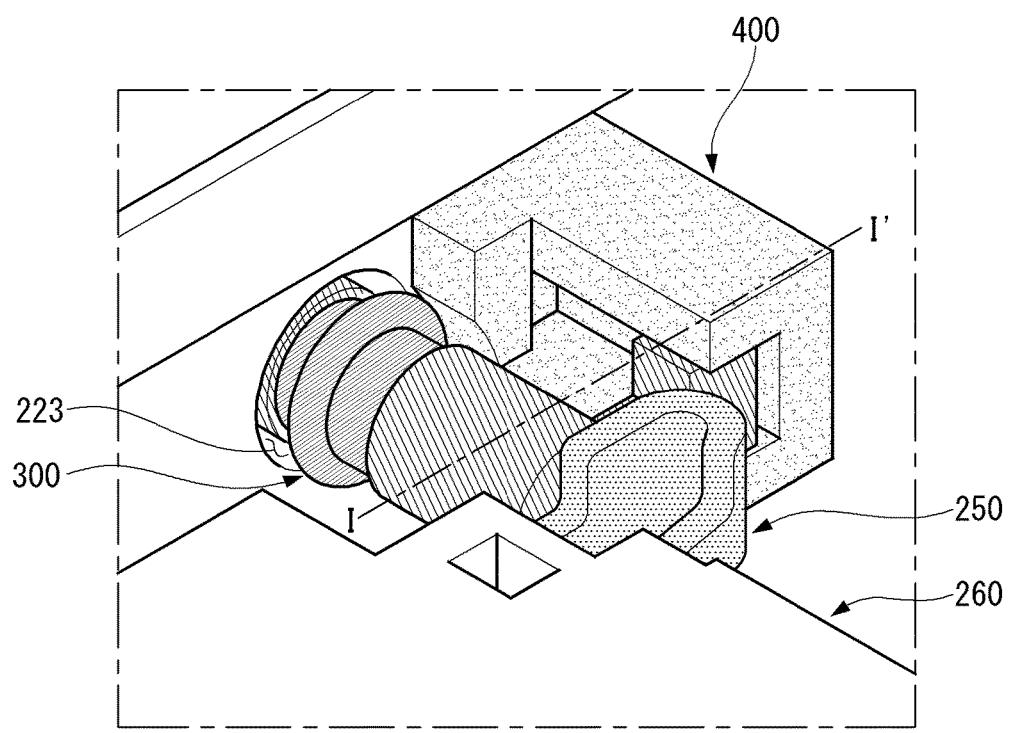

FIG. 21 is a view showing a state in which the second guide portion is included in the mobile terminal of FIG. 20. FIG. 21 is a perspective view of the waterproof unit 300 and the second guide unit 400 viewed from inside the body BD.

The body hole 223 may be opened while at least a part of the SIM tray 210 (see FIG. 4) is drawn outward. The waterproof unit 300 may not be provided with forces or pressures from the force transmitting member 250.

At least a part of the first guide portion 320 may be surrounded by the second guide portion 400. The first guide portion 320 may be guided by the second guide portion 400 when the waterproof unit body 310 moves along the body hole 223.

Figure 22:
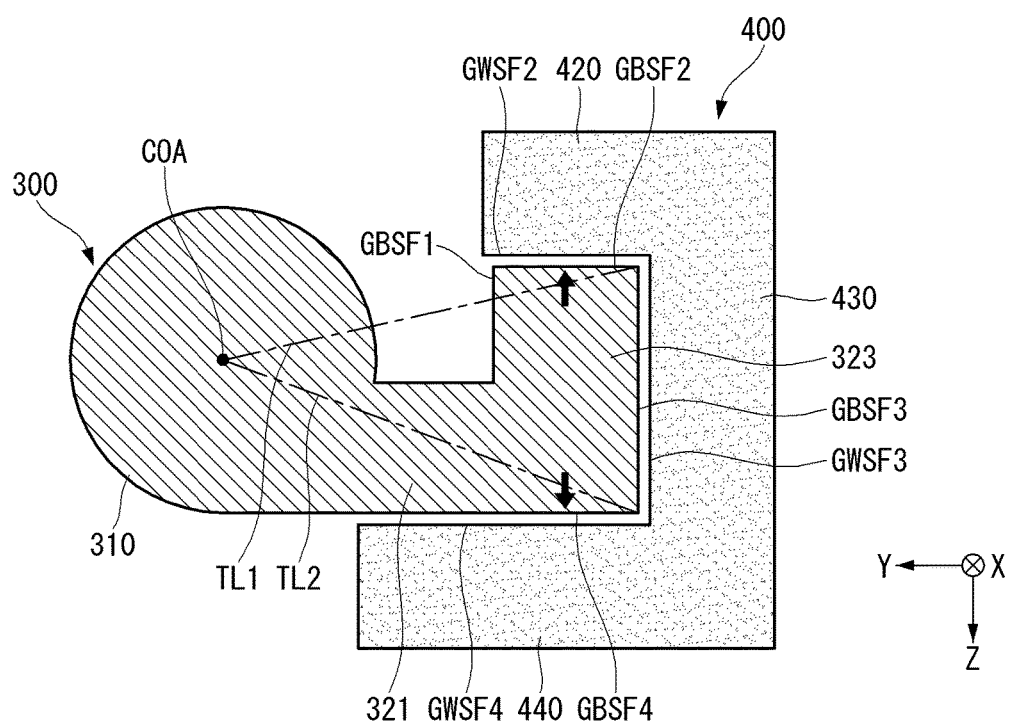

FIG. 22 is a cross-sectional view of the waterproof unit 300 and the second guide portion taken along line I-P of FIG. 21. Referring to FIG. 22, relative positions of the waterproof unit 300 and the second guide portion 400 may be shown when the waterproof unit 300 opens the body hole 223. FIG. 22 may show the relationship between the waterproof unit 300 and the second guide portion 400 in a state in which at least a part of the SIM tray 210 (see FIG. 4) is drawn out.

The second guide portion 400 may cover at least a part of the first guide portion 320. The second to fourth guide walls 420, 430 and 440 may guide the guide bending portion 323 while surrounding the guide bending portion 323.

The second guide portion 400 may form second to fourth guide wall surfaces GWSF2, GWSF3, and GWSF4. The second to fourth guide wall surfaces GWSF2, GWSF3 and GWSF4 may face the second to fourth guide bending surfaces GBSF2, GBSF3 and GBSF4, respectively. The contents related to the first and second torque lines TL1 and TL2 are as almost same as described above.

Figure 23:
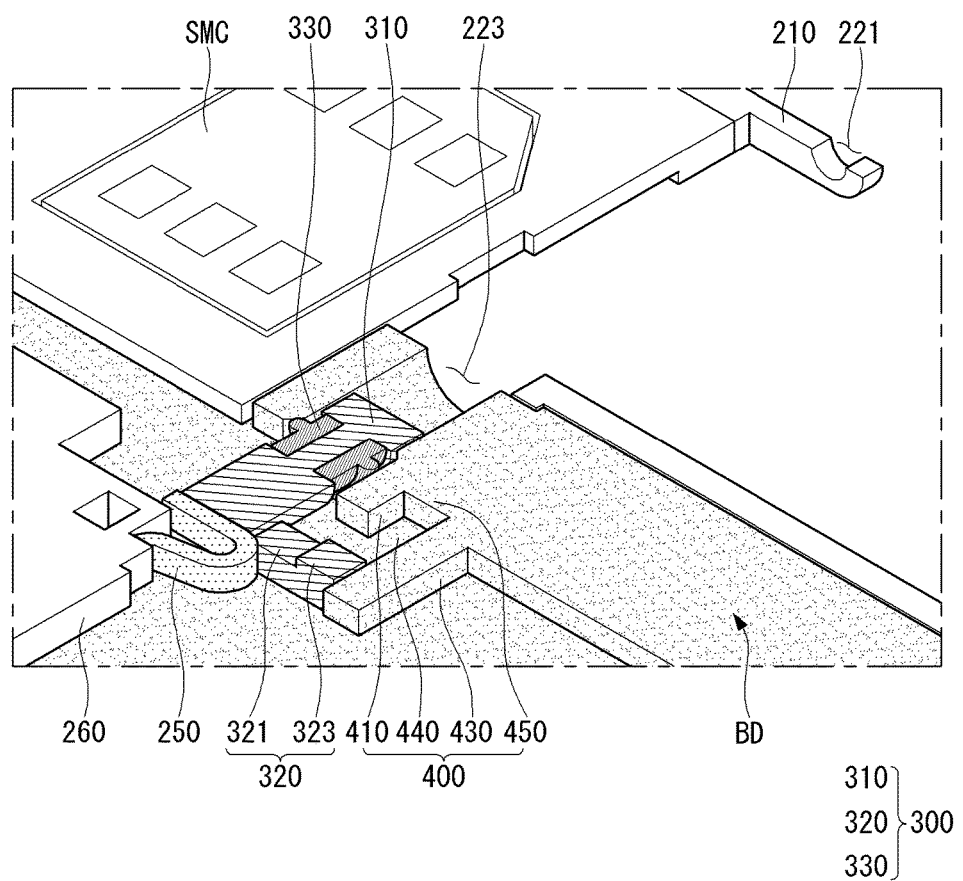

Referring to FIG. 23, the SIM tray 210 may be discharged from the mobile terminal. When at least a part of the force transmitting member 250 is pulled into the inside of the SIM housing 260, at least a part of the SIM tray 210 may be pulled out.

Referring to FIG. 23, when at least a part of the SIM tray 210 is drawn out of the body BD, the SIM card SMC loaded on the SIM tray 210 may be exposed to the outside. The SIM card SMC exposed to the outside may be replaceable and/or exchangeable.

When at least a part of the SIM tray 210 is exposed to the outside of the body BD, liquid or the like may penetrate into the space where the SIM tray 210 is discharged outside. It may not be necessary to waterproof the body hole 223 when at least a part of the SIM tray 210 is exposed to the outside of the body BD. The waterproof unit 300 may open the body hole 223 when at least a part of the SIM tray 210 is exposed to the outside of the body BD.

Figure 24:
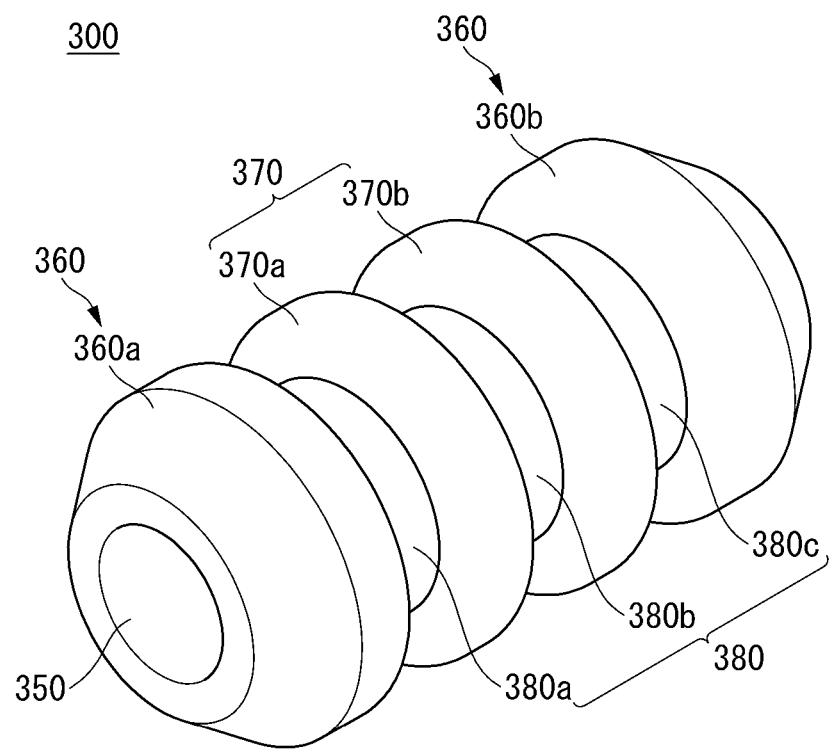
FIGS. 24 to 37 are views related to a waterproof unit according to a second embodiment of the present invention.

FIG. 24 may represent a waterproof unit according to a second embodiment of the invention. Referring to FIG. 24, the waterproof unit 300 may include a rod 350. The rod 350 may have a high rigidity. The rod 350 may comprise a metal. The rod 350 may have a bar shape as a whole. The rod 350 may have a cylindrical shape. The longitudinal direction of the rod 350 may mean the longitudinal direction of the waterproof unit 300.

The stopper 360 may be connected to the rod 350. For example, the rod 350 may be fitted in the stopper 360. For example, the stopper 360 may be formed by a rod 350 and an insert molding (injection molding). The stopper 360 may be located at an end of the rod 350. The stopper 360 may cover a part of the outer circumferential surface of the rod 350. A plurality of stoppers 360 may be provided. For example, the stopper 360 may include a first stopper 360a and a second stopper 360b. The first stopper 360a may be located at one end of the rod 350. The second stopper 360b may be located at the other end of the rod 350.

The packing ring 370 may be connected to the rod 350. For example, the rod 350 may be fitted in the packing ring 370. For example, the packing ring 370 may be formed with the rod 350 and insert molding (injection molding). The packing ring 370 may be positioned between both ends of the rod 350. The packing ring 370 may be positioned between the first stopper 360a and the second stopper 360b. The packing rings 370 may be provided in plural. For example, the packing ring 370 may include a first packing ring 370a and a second packing ring 370b. The packing ring 370 may be integrally formed with the stopper 360.

A connection portion 380 may be connected to the rod 350. For example, the rod 350 may be fitted in the connection portion 380. For example, the connection portion 380 may be formed by a rod 350 and an insert molding (injection molding). The connection portion 380 may be provided in plural. For example the connection portion 380 may have a first to a third connection portion 380a, 380b, and 380c. The connection portion 380 may connect the stopper 360 and the packing ring 370. For example, the first connection portion 380a may connect the first stopper 360a and the first packing ring 370a. The third connection portion 380c may connect the second stopper 360b and the second packing ring 370b. The second connection portion 380b may connect the first packing ring 370a and the second packing ring 370b. The connection portion 380 may connect the first packing ring 370a and the second packing ring 370b. The connection portion 380 may be formed integrally with the stopper 360. The connection portion 380 may be integrally formed with the packing ring 370.

Figure 25:
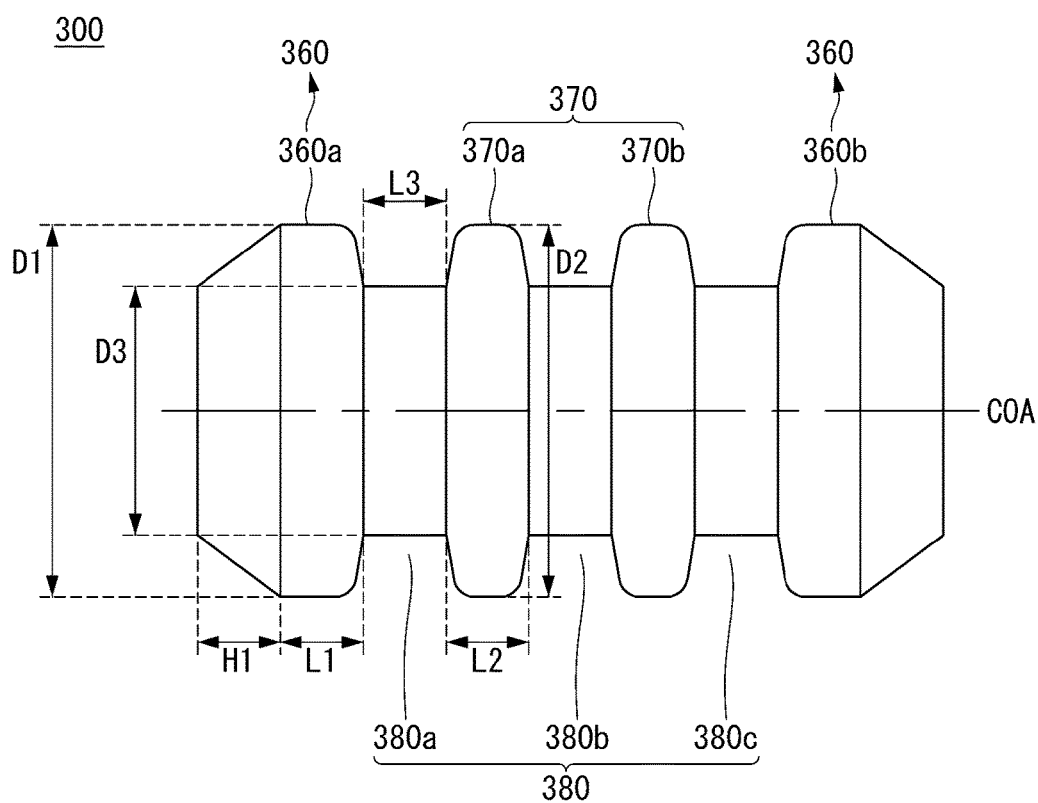

Referring to FIG. 25, the waterproof unit 300 may have a virtual center line COA. The virtual center line COA may be an axis of symmetry of the waterproof unit 300. The virtual center line COA may be the axis of rotation of the waterproof unit 300.

The first stopper 360a may have a first diameter D1. The first diameter D1 may mean the diameter of the first stopper 360a. The first diameter D1 may mean the diameter before the first stopper 360a is inserted into the body hole 223 (see FIG. 5).

The second stopper 360b may have the same diameter as the diameter of the first stopper 360a. For example, the second stopper 360b may have a first diameter D1. The second stopper 360b may have the same shape as the first stopper 360a. The second stopper 360b may be disposed symmetrically with the first stopper 360a.

The first packing ring 370a may have a second diameter D2. The second diameter D2 may mean the diameter of the first packing ring 370a. The second packing ring 370b may have the same diameter as the diameter of the first packing ring 370a. For example, the second packing ring 370b may have the second diameter D2. The second diameter D2 may mean the diameter before the first packing ring 370a is inserted into the body hole 223 (see FIG. 5). The second diameter D2 may be substantially the same as the first diameter D1. The second diameter D2 may be smaller than the first diameter D1.

The connection portion 380 may have a third diameter D3. The third diameter D3 may mean the diameter of the first connection portion 380a. The third diameter D3 may mean the diameter of the second connection portion 380b. And the third diameter D3 may mean the diameter of the third connection portion 380c. The third diameter D3 may be smaller than the second diameter D2. The third diameter D3 may be smaller than the first diameter D1.

A valley may be formed between the stopper 360 and the packing ring 380. A concave shape may be formed between the stopper 360 and the packing ring 380. For example, a concave shape may be formed between the first stopper 360a and the first packing ring 370a. For example, a concave shape may be formed between the second stopper 360b and the second packing ring 370b.

A concave shape may be formed between adjacent packing rings 370. For example, a concave shape may be formed between the first packing ring 370a and the second packing ring 370b.

The first stopper 360a may have a first length L1 in the longitudinal direction of the waterproof unit 300. The first length L1 may mean the length of the first stopper 360a that forms the first diameter D1. The first length L1 may determine the contact area between the stopper 360 and the body hole 223 (see FIG. 5). The contact area between the stopper 360 and the body hole 223 (see FIG. 5) in the state where the stopper 360 is inserted into the body hole 223 (see FIG. 5) may depend on the first length L1. The waterproof performance of the waterproof unit 300 may depend on the contact area between the stopper 360 and the body hole 223 (see FIG. 5).

The first stopper 360a may include an inclined shape. The inclined shape of the first stopper 360a may have a first height H1. The inclined shape of the first stopper 360a may be extended from the cylindrical shape of the first stopper 360a. The cylindrical shape of the first stopper 360a may have a first length L1 and a first diameter D1. The inclined shape of the first stopper 360a may have a frustum shape. The first height H1 may have effect on the inclination of the inclined shape of the first stopper 360a. The tilted inclination of the tapered shape of the stopper 360 may guide the stopper 360 to the body hole 223 (see FIG. 5) in the process of inserting the stopper 360 into the body hole 223 (see FIG. 5).

The second stopper 360b may have the same shape as the first stopper 360a. The second stopper 360b may be disposed symmetrically with the first stopper 360a.

The first packing ring 370a may have a second length L2 in the longitudinal direction of the waterproof unit 300. The longitudinal direction of the waterproof unit 300 may be parallel to the virtual center line COA. The length of the second packing ring 370b may be the same as the length of the first packing ring 370a. For example, the second packing ring 370b may have a second length L2 in the longitudinal direction of the waterproof unit 300.

The second length L2 may have effect on the contact area of the packing ring 370 on the body hole 223 (see FIG. 5). The contact area of the packing ring 370 on the body hole 223 (see FIG. 5) may be the second length L2 when the packing ring 370 is inserted into the body hole 223 (see FIG. 5). The waterproof performance of the waterproof unit 300 may depend on the contact area of the packing ring 370 on the body hole 223 (see FIG. 5). The waterproof performance of the waterproof unit 300 may depend on the contact area of the waterproof unit 300 and on the body hole 223 (see FIG. 5).

The first connection portion 380a may have a third length L3 in the longitudinal direction of the waterproof unit 300. The length of the second connection portion 380b may be the same as the length of the first connection portion 380a. The length of the third connection portion 380c may be the same as the length of the first connection portion 380a. The third length L3 may be related to the length of the concave shape formed in the waterproof unit 300.

Figure 26:
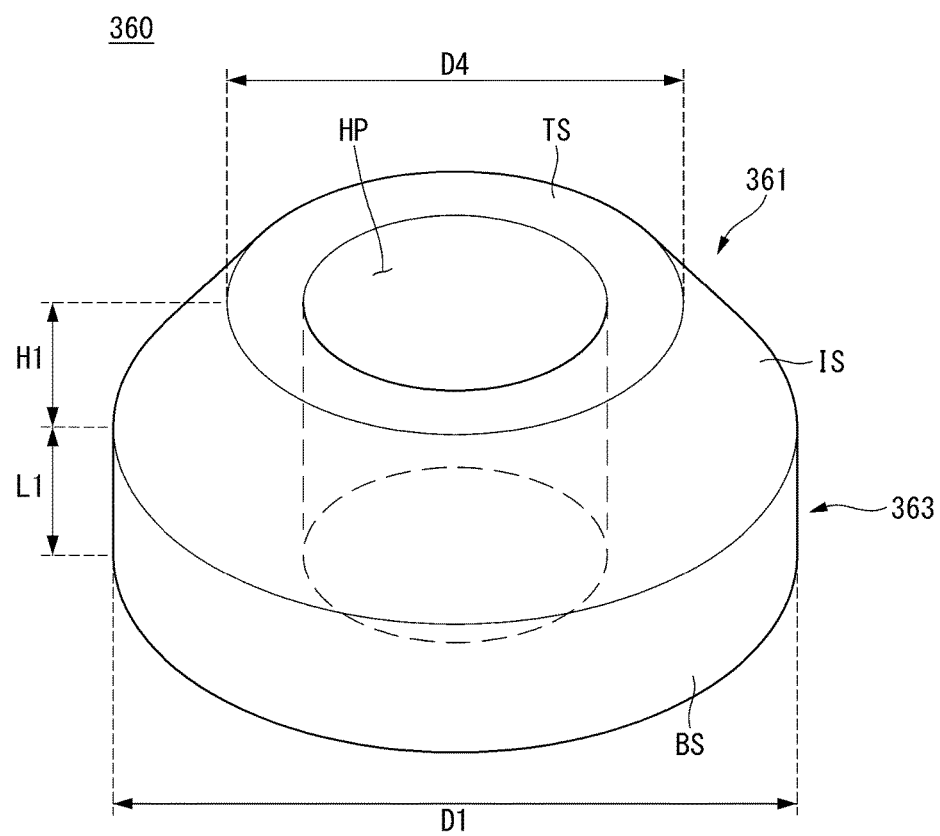

Referring to FIG. 26, the stopper 360 may include a guide 361 and a pedestal 363. The stopper 360 may have a hollow portion HP. The hollow portion HP may provide a space into which the rod 350 (see FIG. 24) is inserted. The hollow portion HP may be formed in the guide 361 and the pedestal 363.

The pedestal 363 may include a cylindrical shape. The pedestal 363 may include a hollow portion HP. The pedestal 363 may have a first diameter D1. The first diameter D1 may be the diameter of the pedestal 363.

The pedestal 363 may have a first length L1. The first length L1 may be the length of the pedestal 363. The first length L1 may be the length of the pedestal 363 in the direction from the pedestal 363 to the guide 361.

The pedestal 363 may form a bottom surface BS. The bottom surface BS may have a hollow circular disk shape. The bottom surface BS may face the packing ring 370 (see FIG. 25). The bottom surface BS may be caught or tugged by the tapered area TPA (see FIG. 5) when the waterproof unit 300 is inserted in the body hole 223 (see FIG. 5). The bottom surface BS may prevent the waterproof unit 300 from being out of the body (BD, see FIG. 5).

The guide 361 may include the shape of a truncated cone. The guide 361 may include a hollow portion HP. One side of the guide 361 may be connected to the pedestal 363. The one side of the guide 361 may have a first diameter D1. The other side of the guide 361 may have a fourth diameter D4. The other side of the guide 361 may form the top surface TS. The guide 361 may have a first height H1. The first height H1 may be the height of the guide 361 in the longitudinal direction of the stopper 360. The longitudinal direction of the stopper 360 may be parallel to the direction from the pedestal 363 to the guide 361.

The guide 361 may include an inclined surface IS. The inclined surface IS may extend from the one side of the guide 361 to the other side of the guide 361. The inclined surface IS may form an inclination with respect to the longitudinal direction of the stopper 360. The longitudinal direction of the stopper 360 may be the longitudinal direction of the waterproof unit 300 (see FIG. 25). The inclined surface IS may guide the entry of the stopper 360 into the body hole 223 (see FIG. 5).

Figure 27:
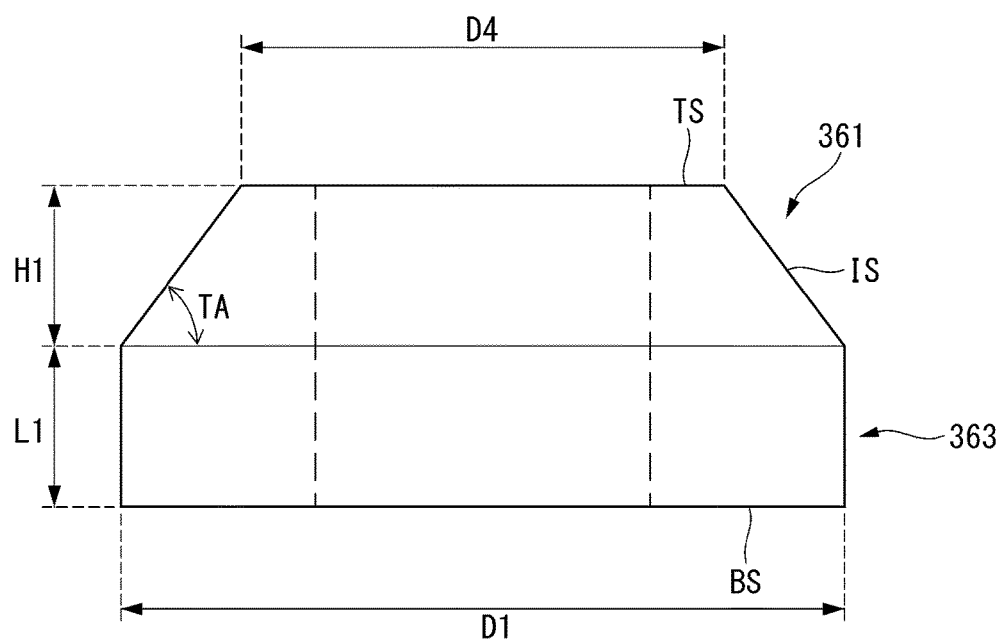

Referring to FIG. 27, the inclination angle TA of the inclined surface IS may depend on the first diameter D1, the fourth diameter D4, and the first height H1. When the first height H1 becomes small, the inclination angle TA may be small. When the first diameter D1 becomes large, the inclination angle TA may be reduced. When the fourth diameter D4 becomes small, the inclination angle TA may be small.

Figure 28:
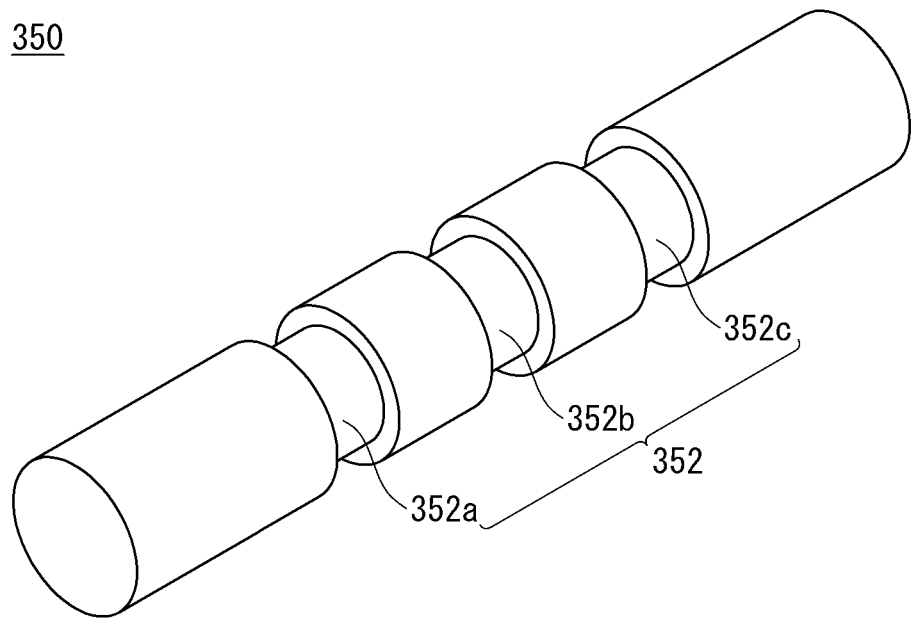

Referring to FIG. 28, a depression 352 may be formed on the rod 350. The depression 352 may have a concave shape at the outer surface of the rod 350. The depression 352 may be formed in the rod 350 in the azimuthal direction of the rod 350.

A plurality of depressions 352 may be provided. For example, the depression 352 may include a first depression 352a, a second depression 352b, and a third depression 352c. The plurality of depressions 352 may be spaced apart. The plurality of depressions 352 may be disposed along the longitudinal direction of the rod 350.

Figure 29:
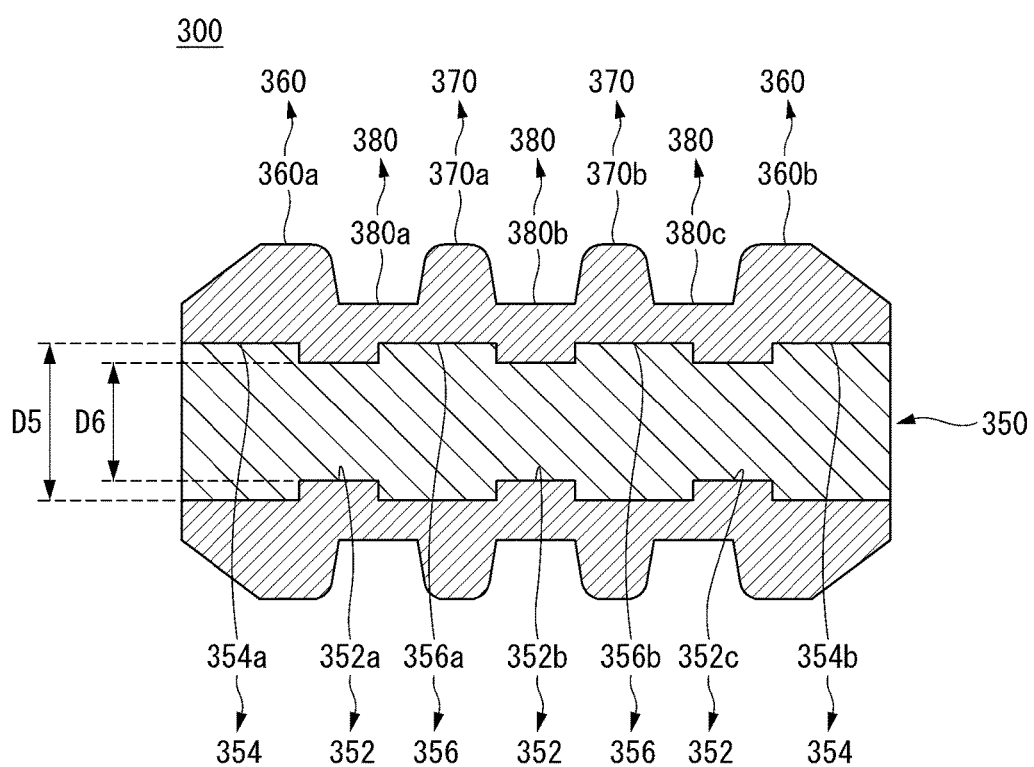

Referring to FIG. 29, the cross section of the waterproof unit 300 may be observed. The cross section of the waterproof unit 300 to be observed may be a cross section cut along the axial direction of the waterproof unit 300. The cross section of the waterproof unit 300 may represent a rod 350, a stopper 360, a packing ring 370, and a connection portion 380. The rod 350 may be inserted into the stopper 360, the packing ring 370 and the connection portion 380.

The rod 350 may include an end protruding surface 354 and an inner protruding surface 356 and a depression 352.

The end protruding surface 354 may be located at the end of the rod 350. The end protruding surface 354 may have a fifth diameter D5. The fifth diameter D5 may be the diameter of the end protruding surface 354. The end protruding surface 354 may include a first end protruding surface 354a and a second end protruding surface 354b. For example, the fifth diameter D5 may be the diameter of the first end protruding surface 354a. For example, the fifth diameter D5 may be the diameter of the second end protruding surface 354b.

The inner protruding surface 356 may be located between the first end protruding surface 354a and the second end protruding surface 354b. The inner protruding surface 356 may include a first inner protruding surface 356a and a second inner protruding surface 356b. The first inner protruding surface 356a may be spaced apart from the second inner protruding surface 356b. The diameter of the inner protruding surface 356 may be substantially the same as the diameter of the end protruding surface 354. For example, the diameter of the inner protruding surface 356 may be the fifth diameter D5.

The depression 352 may be located between the protruding surfaces 354 and 356. A plurality of depressions 352 may be provided. For example, the first depression 352a may be located between the first end protruding surface 354a and the first inner protruding surface 356a. For example, the second depression 352b may be located between the first inner protruding surface 356a and the second inner protruding surface 356b. For example, the third depression 352c may be located between the second inner protruding surface 356b and the second end protruding surface 354b.

The depression 352 and the protruding surface 354 and 356 may form unevenness (concave and convex portions) on the rod 350. The unevenness formed on the rod 350 by the depressions 352 and the protruding surfaces 354 and 356 may prohibit the stopper 360 and/or the packing ring 370 and/or the connection portion 380 from being separated from the rod 350.

The stopper 360 may have a shape that surrounds the end protruding surface 354 of the rod 350. The stopper 360 may be in contact with the end protruding surface 354 of the rod 350. The stopper 360 may be located on the end protruding surface 354 of the rod 350. For example, the first stopper 360a may be located on the first end protruding surface 354a of the rod 350. For example, the second stopper 360b may be located on the second end protruding surface 354b of the rod 350.

The packing ring 370 may have a shape that surrounds the inner protruding surface 356 of the rod 350. The packing ring 370 may be in contact with the inner protruding surface 356 of the rod 350. The packing ring 370 may be located on the outer peripheral surface of the inner protruding surface 356 of the rod 350. For example, the first packing ring 370a may be located on the first inner protruding surface 356a. For example, the second packing ring 370b may be located on the second inner protruding surface 356b.

The connection portion 380 may have a shape surrounding the depression 352 of the rod 350. The connection portion 380 may be in contact with the depression 352 of the rod 350. The connection portion 380 may be located on the depression 352 of the rod 350. For example, the second connection portion 380b may be located on the second depression 352b of the rod 350. The diameter of the connection portion 380 may be smaller than the diameter of the stopper 360 or the diameter of the packing ring 370. Accordingly, when the connection portion 380 is located on the depression 352 of the rod 350, the connection portion 380 may form a thickness of a certain level or more. Here, the thickness of the connection portion 380 may mean the difference between the outer diameter and the inner diameter of the connection portion 380. The connection portion 380 having a thickness equal to or greater than a certain thickness may contribute to the durability of the waterproof unit 300.

Figure 30:
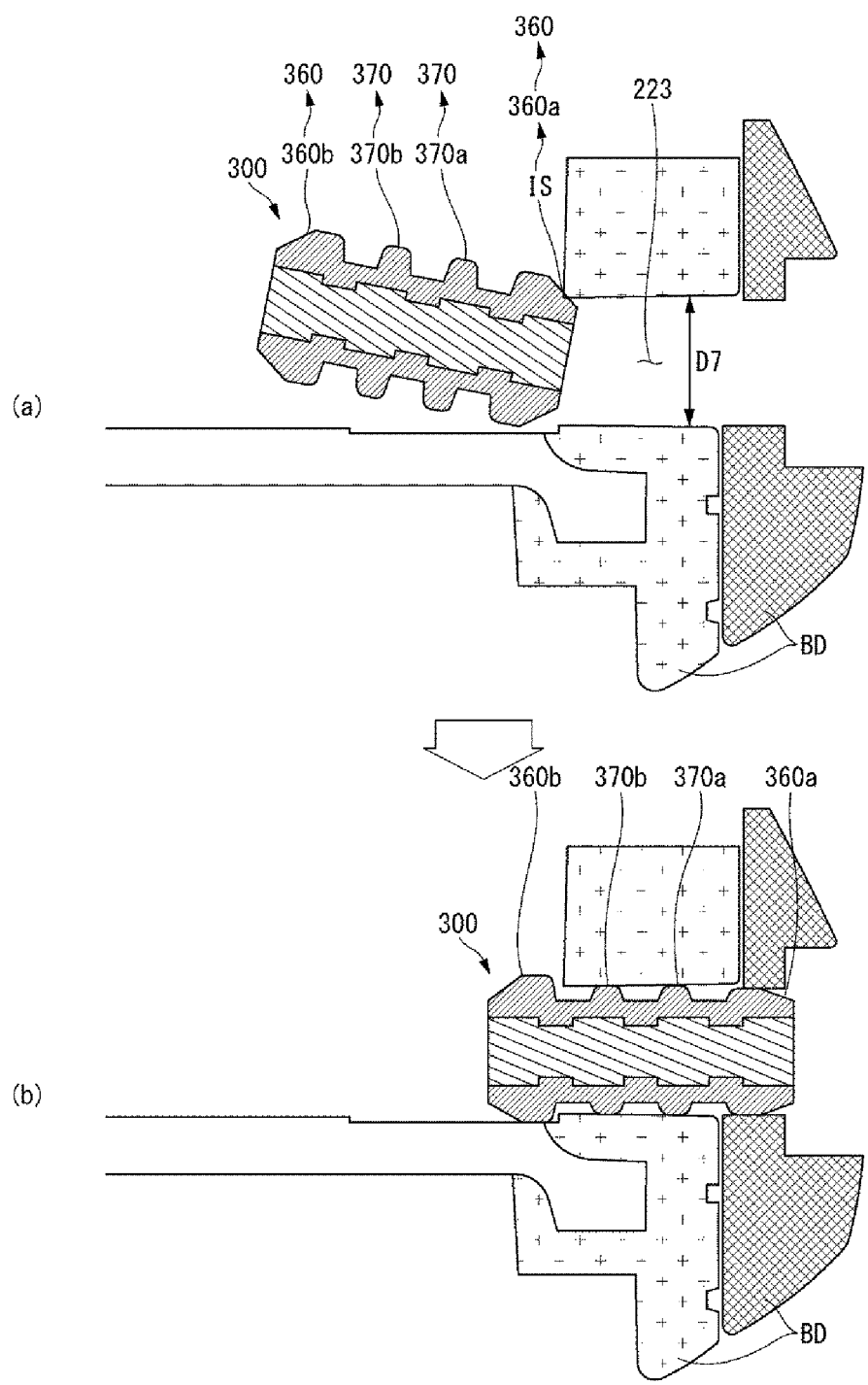

Referring to FIG. 30, it may be observed the process that the waterproof unit 300 is mounted on the body BD of the mobile terminal.

The body BD may form a body hole 223. The body hole 223 may communicate with the inside and the outside of the body BD. One side of the body hole 223 may be connected to the inside of the body BD, and another side of the body hole 223 may be connected to the outside of the body BD. The one side of the body hole 223 may be referred to as a first side of the body hole 223. The other side of the body hole 223 may be referred to as a second side of the body hole 223. The first side of the body hole 223 may be connected to the inside of the body BD. And the second side of the body hole 223 may be connected to the outside of the body BD. The body hole 223 may have a cylindrical shape. The diameter of the body hole 223 may be the seventh diameter D7. The seventh diameter D7 may be smaller than the diameter of the stopper 360. The seventh diameter D7 may be smaller than the diameter of the packing ring 370.

The waterproof unit 300 may enter the first side of the body hole 223. When the waterproof unit 300 enters the body hole 223, the inclined surface IS of the first stopper 360a may guide the waterproof unit 300. When the waterproof unit 300 is guided to the entrance of the body hole 223, the packing ring 370 of the waterproof unit 300 may be stably inserted into the body hole 223. The packing ring 370 inserted into the body hole 223 may be in contact with the body hole 223. The packing ring 370 inserted in the body hole 223 may seal the body hole 223.

The first stopper 360a may have elasticity and/or restoring force. The diameter of the first stopper 360a within the body hole 223 may be smaller than the diameter of the first stopper 360a outside the body hole 223. The first stopper 360a may be pressed within the body hole 223. The packing ring 370 may have elasticity and/or restoring force. The diameter of the packing ring 370 inside the body hole 223 may be smaller than the diameter of the packing ring 370 outside the body hole 223. The packing ring 370 may be pressed within the body hole 223.

The second stopper 360b may be positioned opposite to the first stopper 360a. When the waterproof unit 300 is inserted into and positioned inside the body hole 223, the first stopper 360a may be positioned at the second side of the body hole 223 and the second stopper 360b may be positioned at the first side of the body hole 223. When the waterproof unit 300 is positioned inside the body hole 223, the second stopper 360b may be positioned inside the body BD.

The second stopper 360b may include a bottom surface BS (see FIG. 26). The bottom surface BS of the second stopper 360b may be positioned adjacent to the first side of the body hole 223. The bottom surface BS of the second stopper 360b may be engaged with a structure of the body BD adjacent to the first side of the body hole 223. For example the bottom surface BS of the second stopper 360b may be coupled with the tapered area TPA (see FIG. 5). The bottom surface BS of the second stopper 360b may prevent the waterproof unit 300 from escaping to the outside of the body BD.

FIGS. 31 to 36 are views showing the operation of the waterproof unit 300 according to the second embodiment of the present invention.

Figure 31:
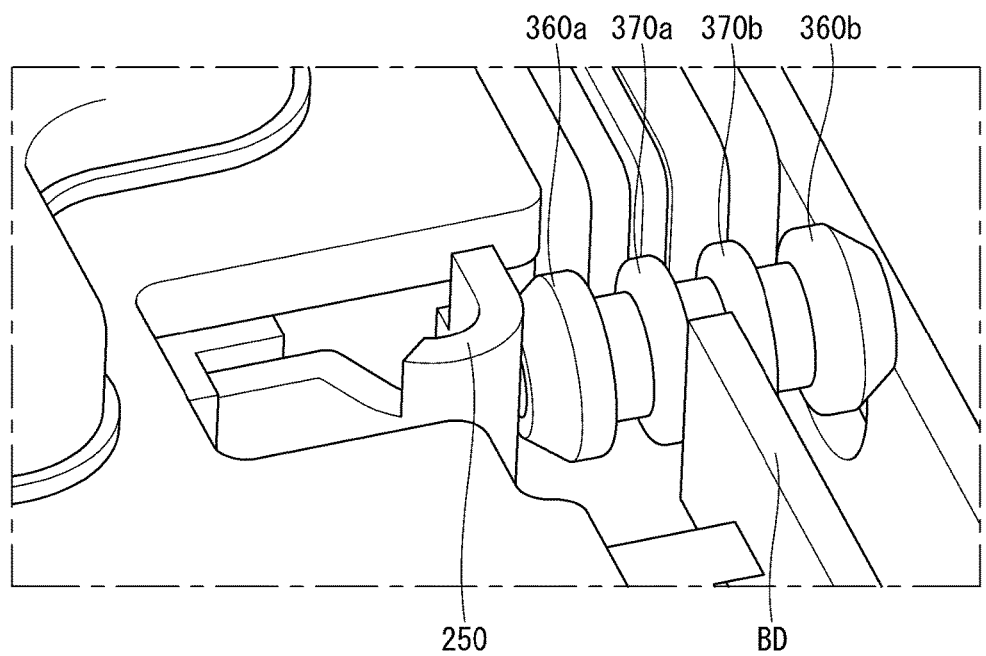
Figure 32:
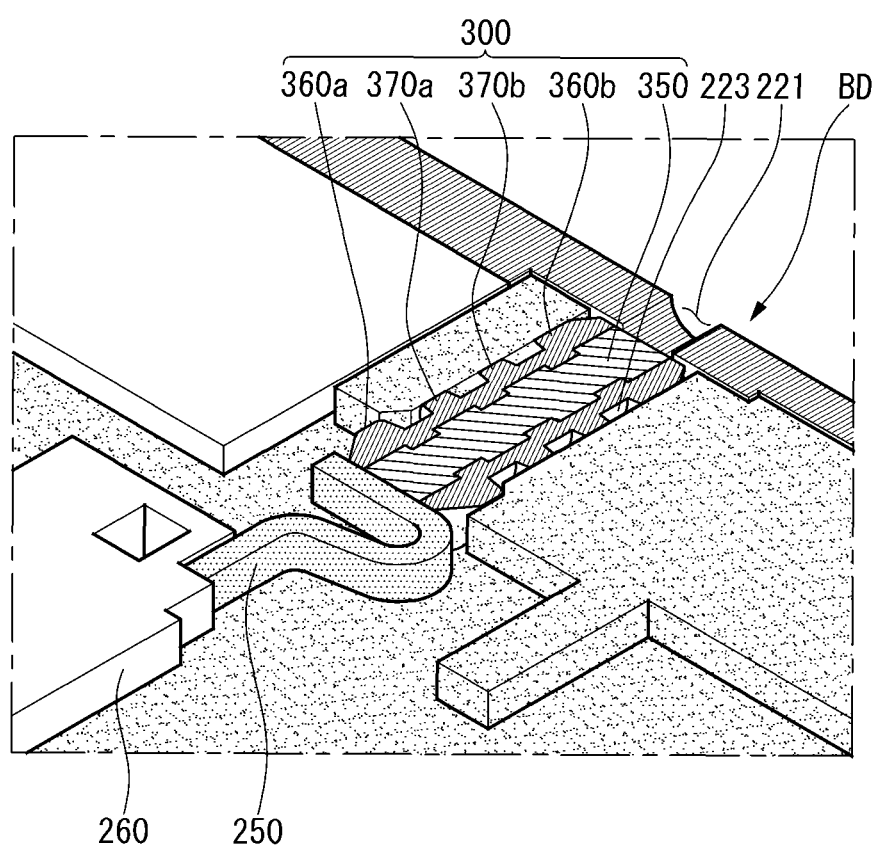
Figure 33:
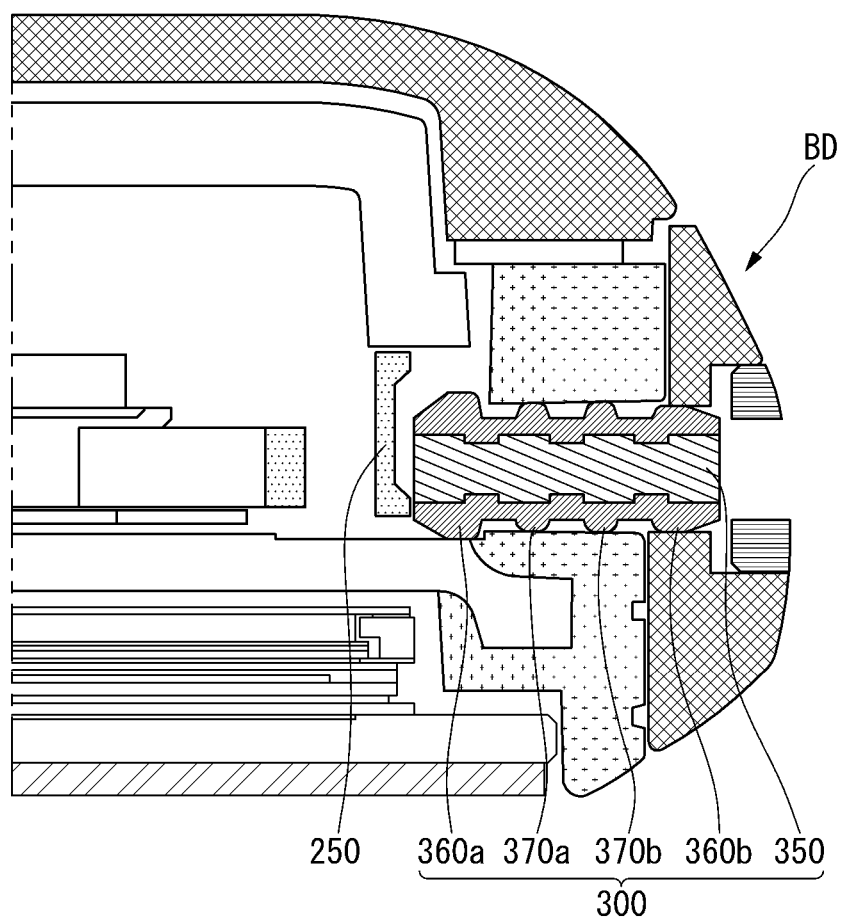

Referring to FIGS. 31 to 33, the waterproof unit 300 may be seated in the body BD. The waterproof unit 300 may be adjacent to the force transmitting member 250. The waterproof unit 300 may face the force transmitting member 250. For example, the first stopper 360a of the waterproof unit 300 may face the force transmitting member 250.

A part of the waterproof unit 300 may be located inside the body hole 223. For example, the second stopper 360b, the second packing ring 370b, and the first packing ring 370a may be located inside the body hole 223. For example, the first packing ring 370a and the second packing ring 370b may contact an inner surface of the body hole 223 to shield or seal the body hole 223. For example, the second stopper 360b contacts the body hole 223 to shield or seal the body hole 223.

Another part of the waterproof unit 300 may be located outside the body hole 223. For example, the first stopper 360a may be positioned at outside of the body hole 223. The first stopper 360a may prevent the waterproof unit 300 from escaping to the outside of the body BD.

Figure 34:
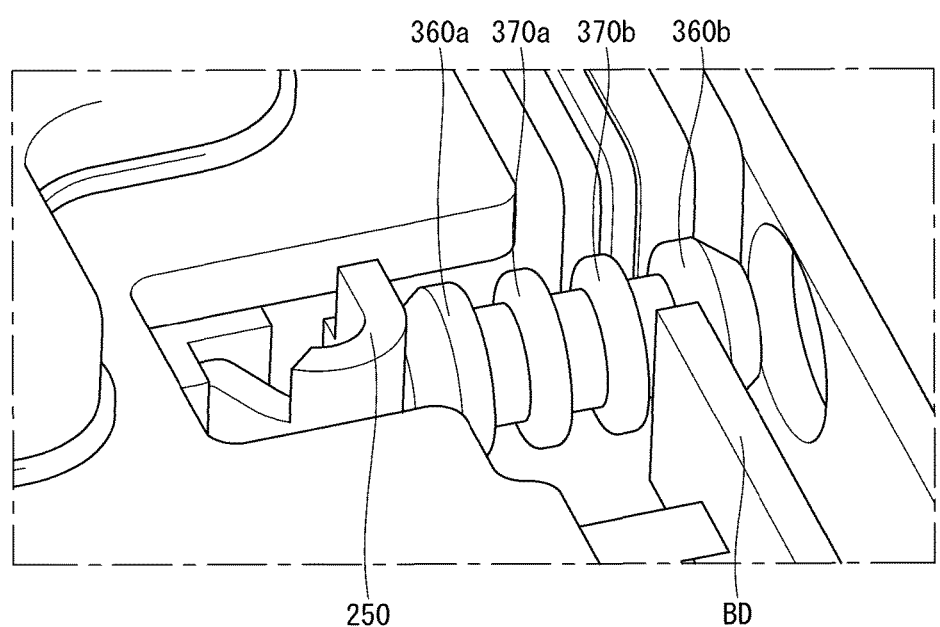
Figure 35:
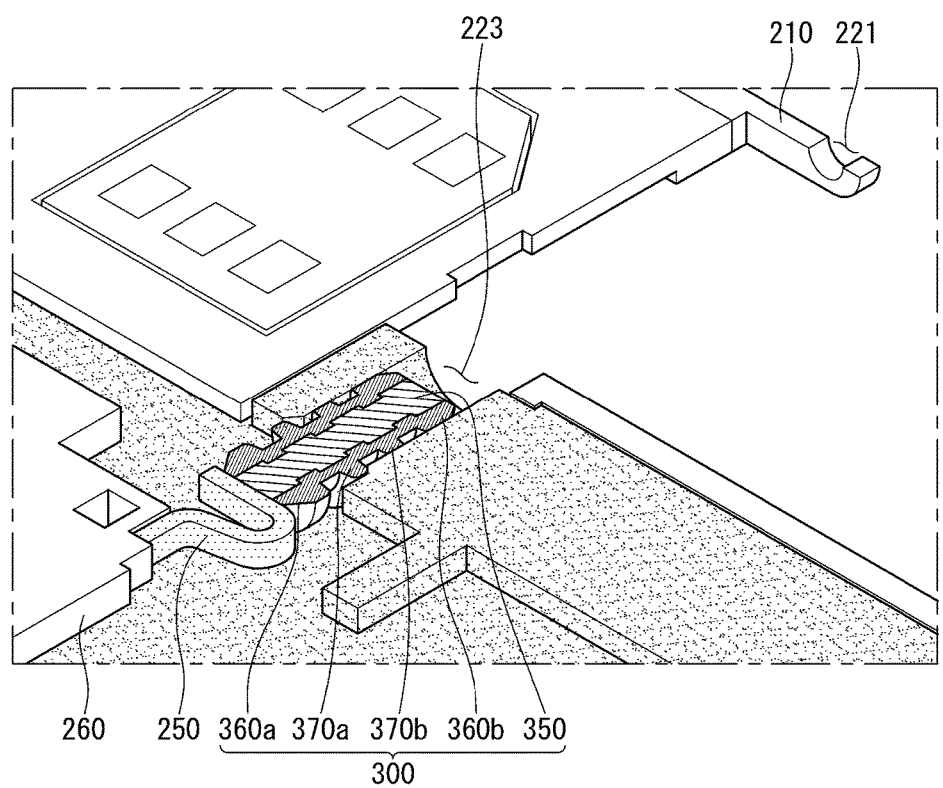
Figure 36:
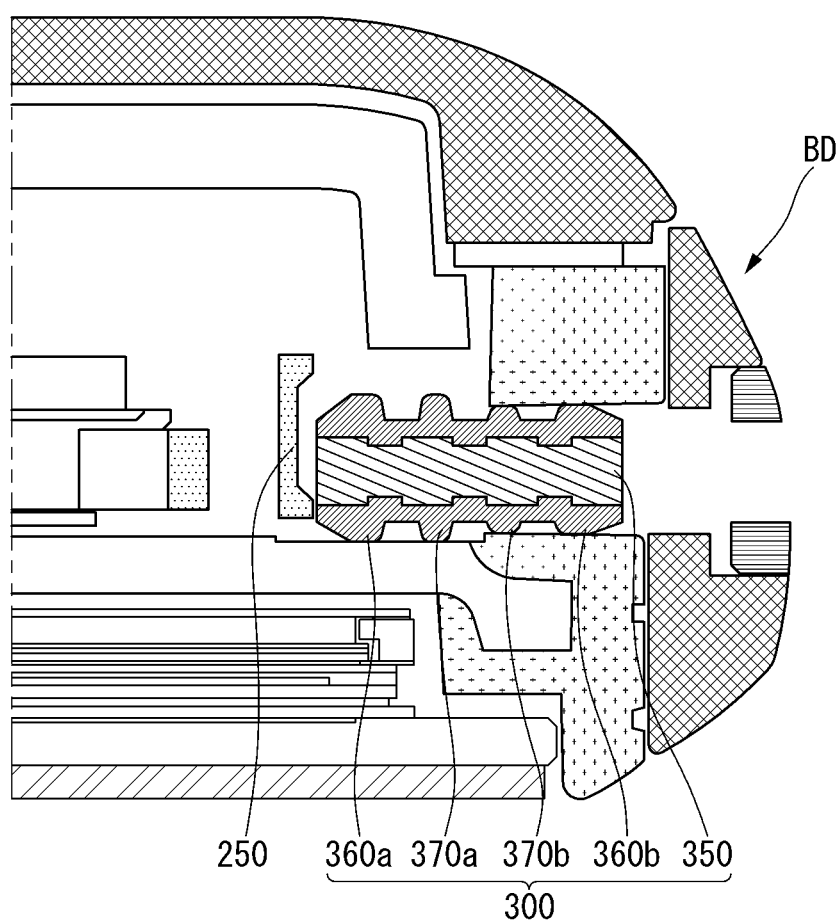

Referring to FIGS. 34 to 36, the waterproof unit 300 has been moved. The waterproof unit 300 may push the force transmitting member 250. The eject pin EPJ (see FIG. 12) may be inserted into the SIM tray hole 221. The eject pin EPJ inserted into the SIM tray hole 221 may push the waterproof unit 300 into the inside of the body BD. The eject pin EPJ, which is supplied with pressure toward the inside of the body BD, may provide the force to the force transmitting member (250). That is, the waterproof unit 300 may move the force transmitting member 250 in the direction toward the inside of the body BD.

Even if the waterproof unit 300 moves from the body hole 223 toward the inside of the body BD, the waterproof unit 300 may need to shield or seal the body hole 223 to maintain the waterproof function. That is, a part of the waterproof unit 300 may need to shield or seal the body hole 223 even if the waterproof unit 300 moves from the body hole 223 toward the inside of the body BD.

The packing ring 370 adjacent to the first stopper 360a may be positioned outside the body hole 223, when the waterproof unit 300 moves from the body hole 223 toward the inside of the body BD. For example, the first packing ring 370a may be located outside the body hole 223. A part of the waterproof unit 300 may shield or seal the body hole 223 even if the waterproof unit 300 moves from the body hole 223 toward the inside of the body BD. For example, the second packing ring 370b may be positioned inside the body hole 223 and the body hole 223 may be shielded or sealed by the second packing ring 370b, even if the waterproof unit 300 moves from the body hole 223 toward the inside of the body BD. For example, even if the waterproof unit 300 moves from the body hole 223 toward the inside of the body BD, the second stopper 360b may be located inside the body hole 223 and may shield or seal the body hole 223.

The second packing ring 370b and the second stopper 360b may be spaced apart from each other in the body hole 223. Therefore, the waterproof unit 300 may stably maintain its posture or attitude inside the body hole 223. The waterproof unit 300 may be stably positioned inside the body hole 223 even if the waterproof unit 300 moves from the body hole 223 toward the inside of the body BD.

The process in which the force transmitting member 250 moves the waterproof unit 300 toward the outside of the body BD or toward the inside of the body hole 223, may be considered. The waterproof unit 300 may stably move inside the body hole 223 when the force transmitting member 250 applies pressure to the waterproof unit 300 toward the outside of the body BD.

Figure 37:
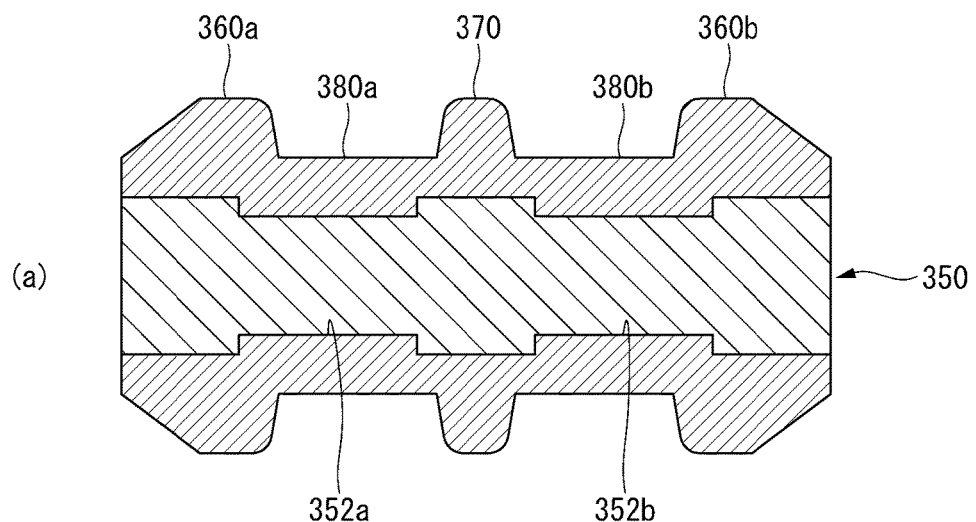
Figure 37:
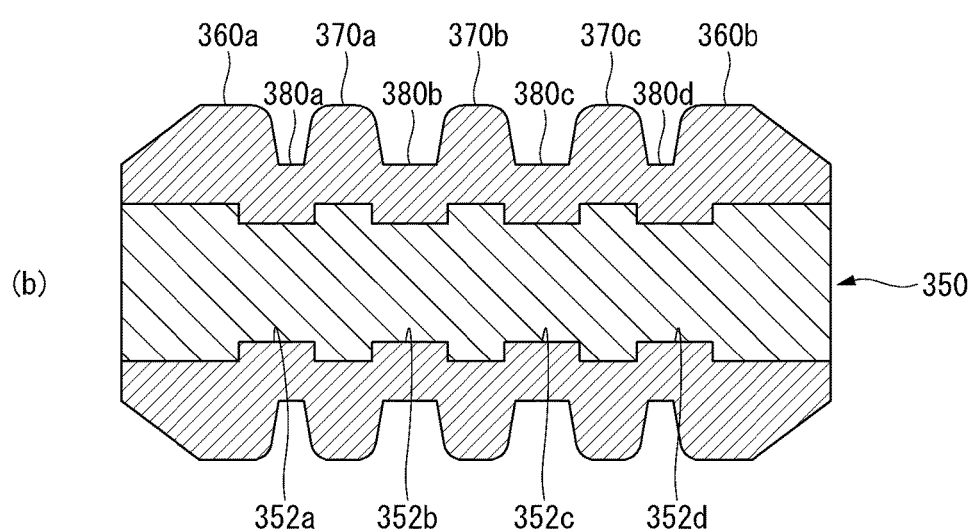

FIG. 37 is a view showing various embodiments of the waterproof unit 300.

Referring to FIG. 37 (a), one packing ring 370 may be positioned between the first stopper 360a and the second stopper 360b. One packing ring 370 may be located inside the body hole 223 (see FIG. 35) even if the waterproof unit 300 moves in the body hole 223 (see FIG. 35). One packing ring 370 may be positioned inside the body hole 223 (see FIG. 35) by adjustment of the length and arrangement of the waterproof unit 300. The embodiment in which one packing ring 370 is provided may have the effect of reducing the frictional force by reducing the contact area of the waterproof unit 300 on the body hole 223 (see FIG. 35).

Referring to FIG. 37 (*b*), three packing rings 370*a*, 370*b*, and 370*c* may be positioned between the first stopper 360*a* and the second stopper 360*b*. At least two packing rings 370*b* and 370*c* out of the three packing rings 370*a*, 370*b* and 370*c* may be positioned in the body hole 223 (see FIG. 35). The embodiment in which the three packing rings 370*a*, 370*b*, and 370*c* are provided may have the effect of stably moving the waterproof unit 300 within the body hole 223 (see FIG. 35). The embodiment in which the three packing rings 370*a*, 370*b*, and 370*c* are provided may have the effect of stably sealing the body hole 223.

FIGS. 38 to 42 are views showing a waterproof unit according to a third embodiment of the present invention.

Figure 38:
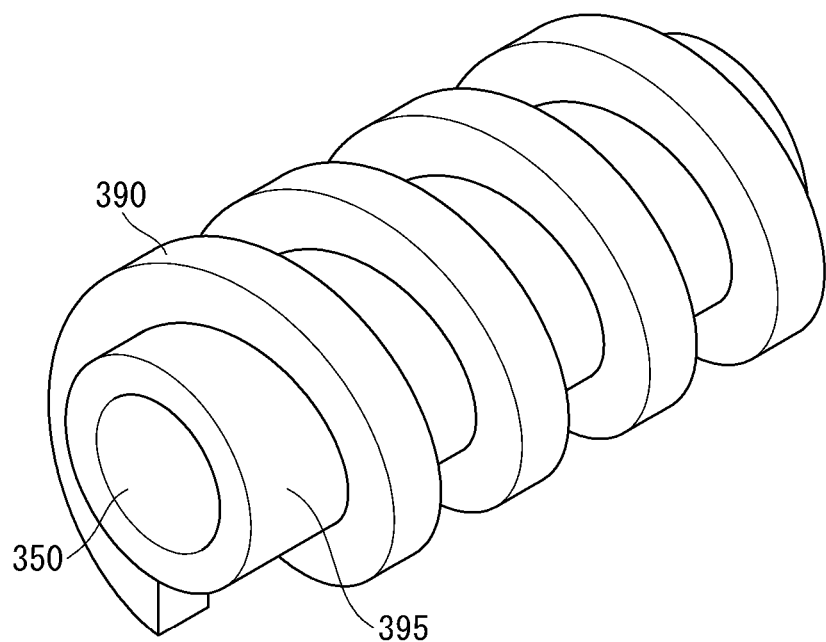
FIGS. 38 to 42 are views related to a waterproof unit according to a third embodiment of the present invention.
Figure 39:
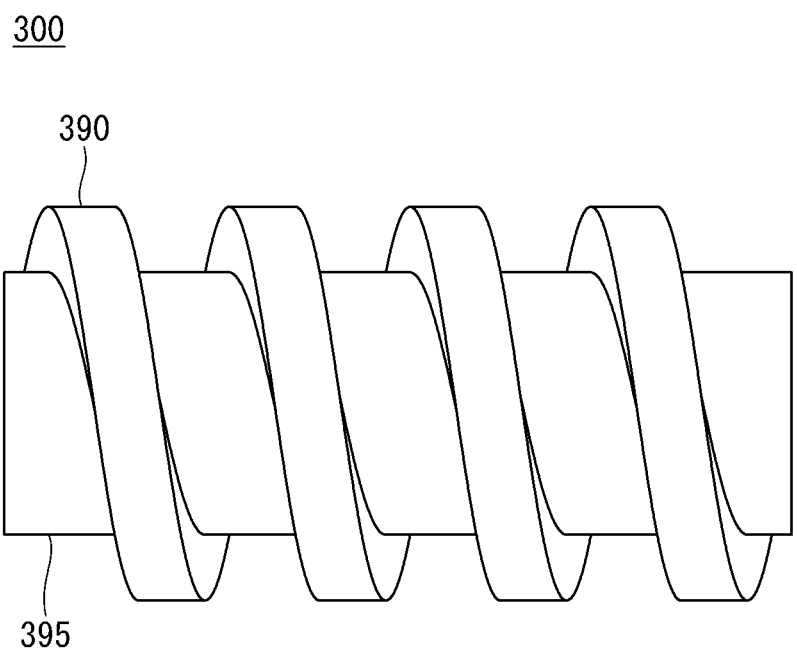

Referring to FIGS. 38 and 39, the waterproof unit 300 may include a rod 350. The rod 350 may have the shape of a circular column as a whole. The shell 395 may have a shape that surrounds around the rod 350. The shell 395 may be coaxial with the rod 350. The rod 350 may be inserted into the shell 395.

The rod 350 may comprise a metal. The shell 395 may comprise a polymeric material. For example, the shell 395 may comprise a plastic. The shell 395 may be formed by insert molding (injection molding) with the rod 350.

The helical packing 390 may be located on the outer circumferential surface of the shell 395. The helical packing 390 may be attached to the shell 395. The helical packing 390 may be formed integrally with the shell 395. The helical packing 390 may have the shape of a screw thread. The helical packing 390 may have elasticity and/or restoring force. The helical packing 390 may have a pitch angle. For example, the helical packing 390 may have a pitch angle of about 12 degrees towards the longitudinal direction of the waterproof unit 300. The helical packing 390 may be in contact with the inner surface of the body hole 223 (see FIG. 35) when the waterproof unit 300 is located in the body hole 223 (see FIG. 35).

Figure 40:
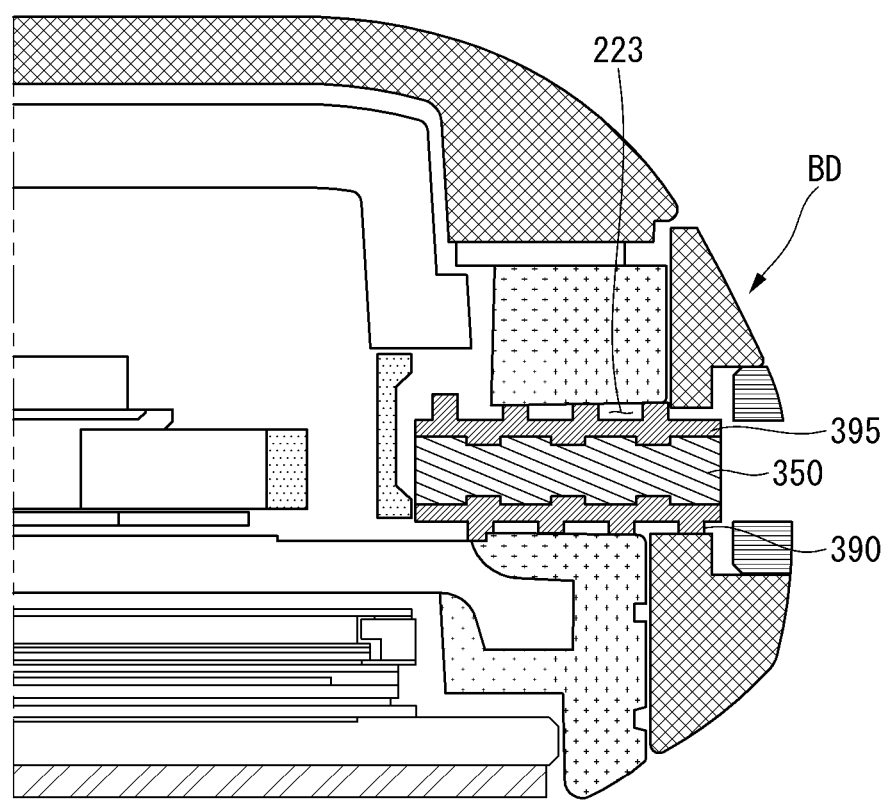

Referring to FIG. 40, the waterproof unit 300 may be located in the body hole 223. The waterproof unit 300 may be positioned inside the body hole 223 and may be in contact with an inner surface of the body hole 223. Even if the waterproof unit 300 moves toward the inside of the body BD, a part of the waterproof unit 300 may be located inside the body hole 223.

Figure 41:
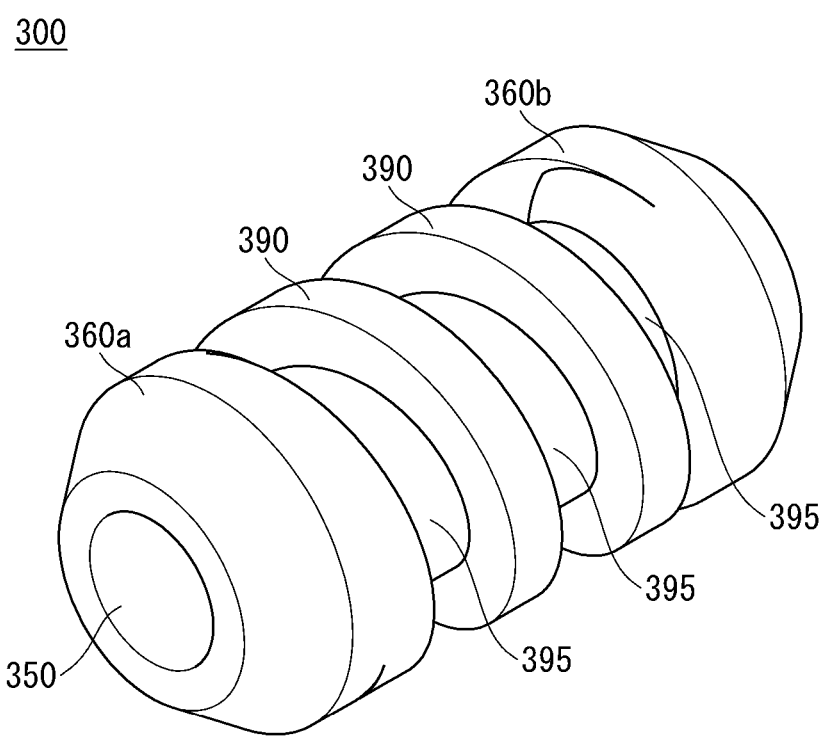
Figure 42:
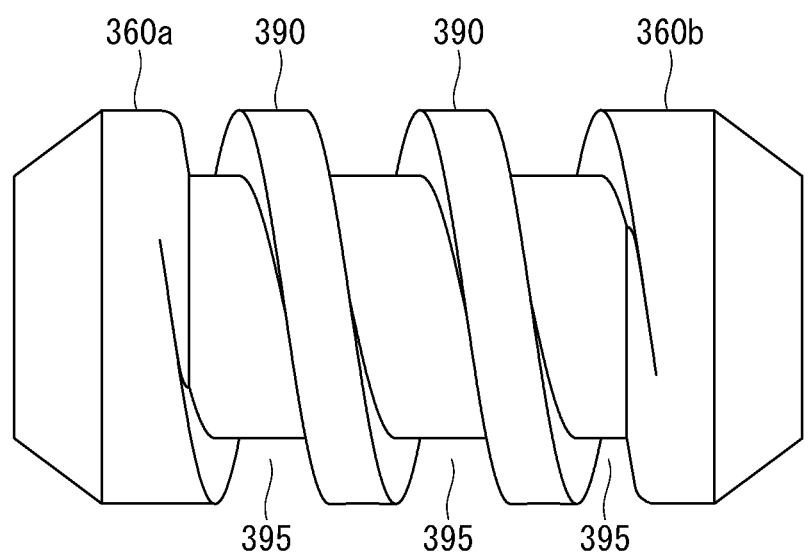

Referring to FIGS. 41 and 42, the waterproof unit 300 may include a stopper 360. A plurality of stoppers 360 may be provided. For example, the stopper 360 may include a first stopper 360*a* and a second stopper 360*b*.

The first stopper 360*a* may be positioned at one end of the waterproof unit 300. The second stopper 360*b* may be located at another end of the waterproof unit 300. The helical packing 390 may be positioned between the first stopper 360*a* and the second stopper 360*b*. The helical packing 390 may be extended toward the second stopper 360*b* from the first stopper 360*a*. The helical packing 390 may shield or seal the body hole 223 (see FIG. 40), when the waterproof unit 300 is positioned in the body hole 223 (see FIG. 40).

One of the first stopper 360*a* and the second stopper 360*b* is positioned inside the body hole 223 (see FIG. 40) even if the waterproof unit 300 has been moved toward the inside of the body BD. When another one of the first stopper 360*a* and the second stopper 360*b* is positioned inside the body hole 223 (see FIG. 40), the waterproof performance of the waterproof unit 300 may be improved.

The foregoing embodiments are merely examples and are not to be considered as limiting the present disclosure. The present teachings may be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
    a body having an interior, the body including a body hole communicating the interior and an outside of the body; and
    a waterproof member positioned and movable in the body hole, the waterproof member including:
        a rod having a longitudinal axis extending in a communicating direction of the body hole, the rod extending from a first end to a second end; and
        a packing member coated on an outer surface of the rod, the packing member including:
            a cladding provided on the rod from the first end of the rod to the second end of the rod, the cladding having a first opening corresponding to the first end of the rod and a second opening corresponding to the second end of the rod;
            a first stopper protruding from the cladding outward in a radial direction, the first stopper being positioned adjacent to the first opening;
            a second stopper protruding from the cladding outward in the radial direction, the second stopper being positioned adjacent to the second opening; and
            a packing ring protruding from the cladding outward in the radial direction, the packing ring being positioned between the first stopper and the second stopper.

2. The mobile terminal of claim 1, wherein the packing ring is made of compressible material, and
    wherein the packing ring has a diameter greater than a diameter of the body hole when the packing ring is not positioned in the body hole.

3. The mobile terminal of claim 1, wherein the packing ring is positioned in the body hole when the waterproof member moves in the body hole.

4. The mobile terminal of claim 1, wherein each of the first stopper and the second stopper includes:
    a pedestal facing the packing ring; and
    a guide extending from the pedestal, the guide having an inclined surface with respect to the longitudinal axis of the rod.

5. The mobile terminal of claim 4, wherein a diameter of the pedestal is greater than a diameter of the body hole.

6. The mobile terminal of claim 5, wherein the guide has a first side connected to the pedestal and a second side spaced from the first side, and wherein the inclined surface connects the first side of the guide to the second side of the guide.

7. The mobile terminal of claim 6, wherein a diameter of the second side of the guide is smaller than a diameter of the first side of the guide.

8. The mobile terminal of claim 1, wherein the rod comprises a metal.

9. The mobile terminal of claim 8, wherein the second stopper is located inside the body hole when the waterproof member moves in the body hole.

10. The mobile terminal of claim 8, wherein the rod includes a depression being recessed toward the longitudinal axis of the rod, wherein the depression is formed on an outer surface of the rod azimuthally with reference to the longitudinal axis, wherein the depression is located between the first end of the rod and the second end of the rod, wherein the depression includes a first depression and a second depression being spaced apart from the first depression, and wherein the first and second depressions are arranged along the longitudinal axis of the rod.

11. The mobile terminal of claim 10, wherein the rod includes:

a first end protruding surface being positioned between the first end of the rod and the first depression, the first end protruding surface protruding radially with respect to the first depression;

an inner protruding surface being positioned between the first depression and the second depression, the inner protruding surface protruding radially with respect to the first and second depressions; and a second end protruding surface being positioned between the second depression and the second end of the rod, the second end protruding surface protruding radially with respect to the second depression, wherein the first stopper is positioned on the first end protruding surface, wherein the second stopper is positioned on the second end protruding surface, and wherein the packing ring is positioned on the inner protruding surface.

12. The mobile terminal of claim 1, further comprising a force transmitting member facing the waterproof member, the force transmitting member being configured to receive a force from the waterproof member when the waterproof member moves towards the interior of the body and to provide a force to the waterproof member when the waterproof member moves towards an exterior of the body.

13. The mobile terminal of claim 12, further comprising:

a Subscriber Identification Module (SIM) housing located in the interior of the body; and a SIM tray movable with respect to the SIM housing, wherein the force transmitting member and the waterproof member are located between a portion of the SIM tray and the SIM housing.

14. The mobile terminal of claim 1, wherein the packing member has a helical shape.

15. The mobile terminal of claim 1, wherein the first stopper is symmetric with the second stopper with reference to the packing ring.

16. The mobile terminal of claim 8, wherein a diameter of the first stopper is greater than a diameter of the body hole.

17. The mobile terminal of claim 11, wherein the cladding, the first stopper, the second stopper, and the packing ring are provided as a single body.

* * * * *